(12) United States Patent
Pearson et al.

(10) Patent No.: US 7,442,220 B2
(45) Date of Patent: Oct. 28, 2008

(54) ASSEMBLY FOR COLLECTING MATERIAL ENTRAINED IN A GAS STREAM

(75) Inventors: John Pearson, Co. Curham (GB); Thomas Stephen Bittle, Newcastle Upon Tyne (GB); Raymond Francis Trowsdale, Consett (GB); Brian Lane, Hebburn (GB)

(73) Assignee: Parker Hannifin Limited, Hemel Hempstead (GB)

( * ) Notice: Subject to any disclaimer, the term of this patent is extended or adjusted under 35 U.S.C. 154(b) by 0 days.

(21) Appl. No.: 11/625,014

(22) Filed: Jan. 19, 2007

(65) Prior Publication Data

US 2007/0271884 A1    Nov. 29, 2007

Related U.S. Application Data

(63) Continuation of application No. PCT/GB2005/002948, filed on Jul. 26, 2005.

(30) Foreign Application Priority Data

Aug. 5, 2004    (GB) ................................ 0417458.7

(51) Int. Cl.
    *B01D 46/00*    (2006.01)
(52) U.S. Cl. ............................. 55/418; 55/498; 55/502; 55/504; 210/444
(58) Field of Classification Search ............. 55/318, 55/320, 410, 418, 447, 456, 457, 458, 476, 55/498, 502, 505, 507, 508, 504
    See application file for complete search history.

(56) References Cited

U.S. PATENT DOCUMENTS 3,890,123 A    6/1975    Kuga
(Continued)

FOREIGN PATENT DOCUMENTS

DE    3909402 A1    9/1990
(Continued)

OTHER PUBLICATIONS

International Search Report in corresponding International Application No. PCT/GB05/002948.
(Continued)

*Primary Examiner*—Frank M Lawrence
*Assistant Examiner*—Robert A Clemente
(74) *Attorney, Agent, or Firm*—Christopher H. Hunter

(57) ABSTRACT

An assembly for collecting material entrained in a gas stream comprising a housing having a head part and a body part, and inlet and outlet ports. A chamber port is provided in the head part having internal walls defining a primary chamber with a first end communicating with the chamber port and an opening at a second end. The axis of the first and second ends of the primary chamber are non-aligned. A flow conduit device has a first end which can fit into the primary chamber in the housing head part so that it is directed generally towards the chamber port in the housing and a second end which is directed towards the body part of the housing to provide a conduit for gas to flow between the body part of the housing and the outlet port. The flow conduit reduces turbulence in the flow of gas within the chamber.

34 Claims, 15 Drawing Sheets

U.S. PATENT DOCUMENTS

| | | | |
|---|---|---|---|
| 3,897,721 A | 8/1975 | Fuhst | |
| 4,360,432 A | 11/1982 | Kieronski | |
| 4,516,994 A * | 5/1985 | Kocher | 55/337 |
| 4,668,256 A * | 5/1987 | Billiet et al. | 96/409 |
| 4,915,831 A * | 4/1990 | Taylor | 210/232 |
| 5,725,621 A * | 3/1998 | Pruette et al. | 55/377 |
| 5,961,678 A * | 10/1999 | Pruette et al. | 55/485 |
| 6,409,786 B1 * | 6/2002 | Wright et al. | 55/507 |
| 6,416,563 B1 * | 7/2002 | Wright et al. | 55/513 |
| 6,440,201 B1 * | 8/2002 | Billiet | 96/147 |
| 6,461,397 B1 * | 10/2002 | Billiet | 55/498 |
| 6,663,685 B2 | 12/2003 | Wright et al. | |
| 6,936,084 B2 * | 8/2005 | Schlensker et al. | 55/321 |
| 6,997,974 B2 * | 2/2006 | Tran et al. | 95/273 |
| 7,326,266 B2 * | 2/2008 | Barnwell | 55/319 |
| 2002/0189216 A1 | 12/2002 | Wright et al. | |

FOREIGN PATENT DOCUMENTS

| | | |
|---|---|---|
| DE | 10309428 A1 | 9/2004 |
| GB | 1236396 | 6/1971 |
| GB | 2126497 A1 | 3/1984 |
| GB | 2194180 A1 | 3/1988 |
| WO | 9930798 A1 | 6/1999 |
| WO | 0238247 A1 | 5/2002 |

OTHER PUBLICATIONS

Notification of Transmittal of the International Preliminary Report on Patentability in corresponding International Application No. PCT/GB05/002948.

* cited by examiner

ASSEMBLY FOR COLLECTING MATERIAL ENTRAINED IN A GAS STREAM

CROSS REFERENCE TO RELATED APPLICATIONS

This application is continuation of copending International Application No. PCT/GB05/002948 filed Jul. 26, 2005, which designated the United States, the disclosure of which is incorporated herein by reference, and which claims priority to Great Britain Patent Application 0417458.7, filed Aug. 5, 2004.

BACKGROUND OF THE INVENTION

This invention relates to an assembly for collecting material entrained in a gas stream.

SUMMARY OF THE INVENTION

Material entrained in a gas stream can be collected and removed from the gas stream flow using many different methods. For example, material entrained in a gas stream can be collected and removed through imparting centrifugal forces on the material by spinning the gas stream, or by passing the gas stream through a filtration medium which removes the material as the gas flows through it.

Removal of material from a gas stream can be required to ensure that the gas is sufficiently clean for a subsequent application, or to minimise adverse effects of impurities on components of the system. For example, removal of compressor oil can be required to minimise chemical contamination and accumulation on valves which might lead to malfunction of the valves, and removal of particulate solid material can be required to minimise abrasion. Also, removal of liquid such as water droplets from a gas stream can be required in order to minimise contaminant loading in downstream filters.

With regard to removing compressor oil from a gas stream, it is known to remove the oil by filtering the gas stream. A filter element used for such filtration has a limited lifetime: accumulation of contaminants with prolonged use gives rise to unacceptable pressure drop, and can also lead to reentrainment of the contaminants in the gas stream. It is therefore necessary to replace the filter element from time to time.

PCT Application No. WO-A-99/30798 discloses a filter assembly which comprises a housing having head and body parts, and a filter element which can be fitted within the housing. The assembly also includes a flow conduit which provides a path for gas to flow from an inlet port in the head part of the housing, to the filter element. The path changes direction by 90°, and the disclosed flow conduit is curved to provide a smooth flow of gas. The flow conduit can be provided as part of the end cap for the filter element.

PCT Application No. WO-A-02/38247 discloses a filter assembly in which a flow path to a filter element within a housing is defined partly by a tubular extension within the head part of a housing and partly by a tubular extension on the filter element. The tubular extensions on the head part of the housing and the filter element sealingly engage one another at their free ends. There is little overlap between the tubular extensions on the head part of the housing and the filter element beyond that which is necessary to provide the seal between them.

The present invention provides an apparatus for removing material entrained in a gas stream in which the head part of the housing has internal walls which define a primary chamber within it, having a first end communicating with the chamber port and an opening at a second end. The filter assembly also includes a flow conduit device extending into the primary chamber to reduce turbulence in the flow of gas within the said chamber and being sealed to the wall of the primary chamber.

Accordingly, in one aspect, the invention provides an assembly for removing material that is entrained in a gas stream, which comprises:

a. a housing having a head part and a body part, and inlet and outlet ports for the gas that is to be filtered, in which at least one of the ports (the "chamber port") is provided in the head part which has internal walls which define a primary chamber within the head part having a first end communicating with the chamber port and an opening at a second end, in which the axes of the first and second ends of the primary chamber are non-aligned, and b. a flow conduit device having a first end which can fit into the primary chamber in the head part of the housing through the opening at the second end so that it is directed generally towards the chamber port in the housing and a second end which is directed towards the body part of the housing to provide a conduit for gas to flow between the body part of the housing and the outlet port, the flow conduit device being configured to reduce turbulence in the flow of gas within the said chamber between the chamber port and the body part of the housing resulting from the non-alignment of the said axes, in which the assembly includes a seal between the wall of the primary chamber in the head part of the housing and the flow conduit device.

The flow conduit device can help to reduce resistance to flow of gas between the chamber port in the head part of the housing and the housing body, caused by the axes of the first and second ends of the primary chamber being non-aligned. The flow conduit device can therefore provide a relatively smooth flow path, as in the case of the flow conduit device which is disclosed in WO-A-99/30798. While the flow conduit device provides for optimum flow of the gas between the chamber port and the body part of the housing, the primary chamber within the head part ensures separation of the gas streams flowing towards and away from the housing body: the roles of optimizing gas flow and separation of the gas streams are therefore allocated to different components of the assembly.

The assembly of the present invention has the advantage compared with the assembly that is disclosed in PCT Application No. WO-A-02/38247 in that there are fewer constraints on design of the head part with a view to minimizing flow resistance. This means for example that the head part can be designed to facilitate manufacture, for example by a casting process. It might also mean that other features can be designed into the head part.

The assembly can operate in an "in-to-out" mode in which the gas flows into the housing via the chamber port and the primary chamber and then out of the housing via the other port in the housing head. The assembly can also operate in an "out-to-in" mode in which the gas flows into the housing via the "non-chamber" port in housing head to and then flows out of the housing via the primary chamber and then the chamber port. Whether the assembly operates in an in-to-out mode or in an out-to-in mode depends on a number of factors including the purpose for which the assembly is being used. For example, when the assembly is being used to filter material from a gas using a filter element as described in more detail below, then the assembly will typically operate in an in-to-out mode. When the assembly is being used to separate material from a gas using centrifugal forces as described in more detail below, then the assembly will typically operate in an out-to-in mode.

Separation of the function of separating the gas streams from the flow conduit device has the advantage that other features can be provided in the flow conduit device. For example, it can allow one or more vanes to be provided in the flow conduit device so that the flow of gas along the conduit passes over the vane and is smoothed by it. It can be easier to manufacture a flow conduit device with these and other features when the flow conduit device is not required also to maintain the separation of the gas streams flowing towards and away from the housing body. For example, the flow conduit device can be formed in two or more parts which can be mated together.

Preferably the flow conduit device is formed from a polymeric material. Preferred polymeric materials include polyolefins (especially polyethylene and polypropylene), polyesters, polyamides, polycarbonates and the like. Polymeric materials used for the flow conduit device can be reinforced, for example by fibrous materials (especially glass fibers or carbon fibers). Materials other than polymeric materials can be used, for example metals.

Preferably the flow conduit device is formed by moulding, for example, by injection moulding.

The flow conduit device can also be used to define an auxiliary chamber within the head part of the housing. There can be a pressure differential between auxiliary and primary chambers, for example with the pressure in one of the chambers corresponding to the pressure in gas which is flowing towards the housing body and the pressure in the other chamber corresponding to the pressure in gas which has passed through the housing body. The auxiliary chamber can contain a device for measuring the difference between the pressure in gas which is flowing towards the housing body and the pressure in gas which has passed through the housing body.

It can be advantageous to ensure that the gas flowing through the primary chamber is subject to as few as disturbances and restrictions as possible. Preferably, the direction taken by the gas flowing between the chamber port and the flow conduit device is approximately constant. Preferably, the portion of the flow path defined by the walls of the primary chamber between the end of the flow conduit device and the chamber port in the head part is approximately straight. Preferably, the walls of the primary chamber extending from the end of the flow conduit device toward the chamber port define a tube of approximately constant cross-section in a plane perpendicular to axis of the flow path.

Preferably, the tube of approximately constant cross-section is a straight tube. Preferably, the direction taken by gas flowing through the end of the flow conduit device is approximately perpendicular to the plane which contains the chamber port. Preferably, the plane which contains the first end of the flow conduit device is approximately parallel to the plane which contains the chamber port.

Preferably, the thickness of the wall of flow conduit device is approximately constant between its first and second openings.

A gap can be provided between the primary chamber wall and the external wall of the flow conduit device. This can be advantageous as it means that the primary chamber and the flow conduit device need not be manufactured so that the flow conduit device is a snug fit within the primary chamber. This can simplify and reduce the cost of manufacturing the assembly. It can also allow for various shaped and sized flow conduit devices that can fit into the primary chamber for a given head part.

Preferably, any change in the direction of the flow path followed by gas between the chamber port and the second end of the flow conduit device is defined by the flow conduit device rather than by the primary chamber. In this context, the flow path is the centre line extending through the primary chamber and the flow conduit device, between the chamber port and the second end of the flow conduit device. This can simplify and reduce the cost of manufacturing of the head part of the housing.

The advantages of the present invention arise in particular when the axis of the flow conduit device at the first end and the axis of the flow conduit device at the second end are not aligned, so that the flow conduit device helps to change the direction of flow of the gas stream. For example, in many applications, the axis of the flow conduit device at the first end and the axis of the flow conduit device at the second end will intersect and the angle between them will be not more than about 150° (the angle being 180° when the axes are coincident). Frequently, the angle between the axes of the conduit openings might be not more than about 120°. The angle will often be at least about 30°, preferably at least about 60°, more preferably at least about 70°, especially preferably at least about 80°, for example about 90°. It will generally be desirable for the axis of the flow conduit device at the first end to be approximately perpendicular to the axis of the flow conduit device at the second end. The flow conduit device can be constructed for such applications with a smoothly curved transition between the conduit openings to minimize restrictions to the flow of the gas stream.

Preferably, the distance between the seal and the first end of the flow conduit device, measured along the centerline thereof, is not less than about the square root of the cross-sectional area of the flow conduit device at the second end thereof (hereinafter referred to as "d"). More preferably, the distance between the seal and the first end of the flow conduit device, measured along the centerline thereof, is not less than 1.5 d, for example not less than 2.0 d.

Preferably, the distance between the seal and the first end of the flow conduit device, measured along the centerline thereof, is not less than about 2.0 cm, more preferably not less than about 3.5 cm.

Preferably, the ratio of (a) the distance between the seal and the first end of the flow conduit device, measured along the centerline thereof, to (b) the length of the flow path for gas from the port in the head part of the housing to the second end of the flow conduit device, measured along the centerline of the flow path, is at least about 0.25, more preferably at least about 0.5. The said ratio can have larger values, for example at least about 1.0, preferably at least about 2.0, more preferably at least about 3.0, especially at least about 4.0 or at least about 5.0.

Preferably, the ratio of (a) the distance between the seal and the second end of the flow conduit device to (b) the distance between the seal and the first end of the flow conduit device, measured along the centerline of the flow conduit device, is not more than about 0.7, more preferably not more than about 0.5, especially not more than about 0.3.

The seal between the wall (often the internal wall, but optionally the external wall) of the primary chamber and the flow conduit device is provided by an O-ring which is compressed between them when the head part and the flow conduit device are assembled together. Preferably, one of the parts, especially the flow conduit device, has a groove formed in its surface and the groove contains an O-ring. Preferably, the other of the parts has an appropriately chamfered leading edge where it first contacts the O-ring during assembly with the other part so that resistance to the assembly is minimised.

Other seal arrangements could be used, for example a face seal between two surfaces, which is compressed between the surfaces.

Preferably, the flow conduit device has an approximately constant internal cross-section along at least a significant part of its length. This can help to minimize resistance to the flow of gas along it. It is appreciated that there might be small changes in the cross-section, for example at one or each end of the conduit (the conduit might be flared outwardly at the end through which the gas stream enters the conduit), or in a region in which the direction of the flow of the gas stream changes. Preferably, the cross-section of the flow conduit device is generally rounded, especially approximately circular.

Preferably, the flow conduit device contains at least one vane positioned within it so that the flow of gas along the conduit between the first and second ends thereof passes over the vane and is smoothed by it. Preferably, the vane is curved when viewed along its length, generally about a vane axis which is approximately perpendicular to the axis of the first end of the flow conduit device and approximately perpendicular to the axis of the second end of the flow conduit device. The vane can extend across the flow conduit device between the opposite walls thereof. Details of a filter assembly in which the flow conduit device which has a vane are disclosed in the co-pending PCT application filed with the present application which claims priority from UK Patent Application No. 0417464.5. Subject matter that is disclosed in that application is incorporated in the specification of the present application by this reference.

Preferably, the flow conduit device contains at least two of the said vanes.

The flow conduit device can be formed in first and second mutable pieces, in which the first piece comprises a first part of the flow conduit device wall and the vane, and the second piece comprises a second part of the flow conduit device wall which has a recess formed in it in which the end of the vane that is remote from the first part of the conduit wall can be received when the first and second pieces are mated. Preferably, the first and second matable pieces of the flow conduit device mate in a plane which contains the first and second conduit openings. Details of a filter assembly in which the flow conduit device which has a vane are disclosed in the co-pending PCT application filed with the present application which claims priority from UK Patent Application No. 0417464.5. Subject matter that is disclosed in that application is incorporated in the specification of the present application by this reference.

Preferably, each of the inlet and the outlet ports is provided in the head part of the housing. Whether it is the inlet or the outlet port that communicates with the primary chamber will depend on a number of factors, and in particular, whether the material is to be removed from the gas stream by centrifugal forces or by a filtration medium. When the material is to be removed from the gas stream by centrifugal forces, preferably the outlet port communicates with the primary chamber. When the material is to be removed from the gas stream by a filtration medium, preferably the inlet port communicates with the primary chamber.

When the material is to be removed from the gas stream by centrifugal forces, preferably the housing head part provides the upper end of the housing and the housing body part provides the lower end of the housing. Preferably the assembly includes a flow director positioned so that gas flowing into the housing flows over the flow director so that the incoming gas is made to follow a generally helical path within the housing.

Preferably the flow director is formed from a polymeric material. Preferred polymeric materials include polyolefins (especially polyethylene and polypropylene), polyesters, polyamides, polycarbonates and the like. Polymeric materials used for the flow director can be reinforced, for example by fibrous materials (especially glass fibers or carbon fibers). Materials other than polymeric materials can be used, for example metals.

Preferably the flow director is formed by moulding, for example, by injection moulding.

A generally helical path is any path which extends around an axis so that material entrained in a gas is forced outward away from the axis, toward the wall of the housing, as a result of centrifugal forces. It is not necessarily that the helical path is a perfect helix. For example, the distance between the helical path of the gas stream and the wall of the housing could increase or decrease as the gas stream flows around the housing axis. For example, the helix spiral shaped so that the helical path tightens towards its leading or trailing end. Further, the angle of the gas stream to a plane perpendicular to the axis about which it flows could increase or decrease along the axis.

Preferably, the assembly includes an outlet tube which extends from the inside of the housing to the second end of the flow conduit device, through which gas flows between the inside of the housing and the flow conduit device. The provision of an outlet tube can isolate the flow of gas which is traveling toward the flow conduit device and away from the lower end of the housing, from the flow of gas which is traveling away from the inlet port and toward the lower end of the housing. This is advantageous as it can prevent the gas flowing away from the lower end of the housing interfering with the gas flowing toward the lower end of the housing. This can be important in order to minimize disturbances to the helical flow of the gas, thereby maintaining the separating property caused by the helical flow of the gas, and also thereby minimizing the pressure drop across the assembly.

Preferably the outlet tube is formed from a polymeric material. Preferred polymeric materials include polyolefins (especially polyethylene and polypropylene), polyesters, polyamides, polycarbonates and the like. Polymeric materials used for the outlet tube can be reinforced, for example by fibrous materials (especially glass fibers or carbon fibers). Materials other than polymeric materials can be used, for example metals.

Preferably the outlet tube is formed by moulding, for example, by injection moulding.

The cross-sectional shape of the outlet tube taken perpendicular to its longitudinal axis can be any regular or irregular shape. Preferably, the cross-sectional shape of the outlet tube is generally rounded. Preferably, the cross-sectional shape of the outlet tube is constant along its length. The size of the cross-sectional shape of the outlet tube need not necessarily be constant along its length. For example, when the cross-sectional shape of the outlet tube is generally rounded, the diameter of the outlet tube can vary along its length.

Preferably, the assembly includes a shield which extends across the housing towards the lower end thereof so as to leave a collection space between it and the lower end in which material that is separated from the gas stream can collect, with at least one opening in or around the shield through which the material can flow past the shield into the collection space. The shield acts to quell the turbulent air flow so as to create a "quiet space" between itself and the lower end. This quiet space helps to prevent liquid becoming re-entrained in the gas stream. Also, when a drainage port is present, the quiet space can allow the drainage port to function properly.

The faces of the shield can be planar. Preferably, the face of the shield which is directed towards the upper end of the housing is bowl-shaped. This is particularly advantageous when the assembly comprises a flow director located between the inlet port and the shield, wherein the flow director is configured to impart a helical flow to the incoming gas stream. This is because the bowl-shaped face of the shield can help to accelerate the helical flow of gas and to direct it back toward the outlet port. This is in contrast to current flat shields which causes the helical flow of gas to rebound back toward the outlet port in a random, and subsequently inefficient, manner. By maintaining directing it back toward the outlet port in a uniform manner, it has been found that the pressure drop across a separator assembly can be less than that across current separator assemblies. Details of a separator assembly in which the face of the shield which is directed towards the upper end of the housing is bowl-shaped are disclosed in a co-pending UK patent application entitled Separator Assembly filed on the same date as the present application bearing agent's reference P211193. Subject matter that is disclosed in that application is incorporated in the specification of the present application by this reference.

Preferably, the shield is located within the body part of the housing against forces in a direction towards the lower end of the housing as a result of the action against it by the gas stream through engagement between at least one of (a) the edge of the shield and the internal side wall of the housing, and (b) the shield and the base of the housing. As the shield is mounted on the body rather than the head, it is not necessary to use a tie rod extending from the head to secure the shield in the housing. It has been found that by removing the need for a tie rod in the housing, gas flowing through the housing can be subject to less resistance. Accordingly, this can enable the efficiency of the assembly the invention to be enhanced compared with known assemblies. Details of a separator assembly in which the face of the shield which is directed towards the upper end of the housing is bowl-shaped are disclosed in a co-pending UK patent application entitled Separator Assembly filed on the same date as the present application bearing agent's reference P211194. Subject matter that is disclosed in that application is incorporated in the specification of the present application by this reference.

Preferably, the inlet end of the outlet tube faces toward the lower end of the housing. This can help to ensure that gas traveling away from the lower end of the housing enters the outlet tube. When the assembly includes a shield, preferably the inlet end of the outlet tube faces toward the shield. When the face of the shield which is directed toward the upper end of the housing is bowl-shaped, preferably the inlet end of the outlet tube faces toward the bowl-shaped face of the shield. Preferably, an axis extending through the centre of the outlet tube and parallel to the outlet tube at its inlet end, and an axis extending through and perpendicular to the centre point of the bowl-shaped face are coaxial.

Preferably, the flow director is fastened to the outlet tube. The flow director and the outlet tube can be provided as a single piece. For example, the flow director and the outlet tube can be created from a single mould. This can enable easy manufacturing and putting together of the assembly. The flow director and the outlet tube can be provided as separate pieces, which can be fastened together. This can allow different flow directors to be used with different outlet tubes.

If the outlet tube is formed separately from the flow director, then preferably the flow director and the outlet tube are formed form the same material. Preferably, the flow director outlet tube can be fastened to the outlet tube so that it can be subsequently removed. For example, preferably the flow director is fastened to the outlet through the use of a mechanical fastening such as a latch, co-operating screw threads, or engaging bayonet formations. More preferably, the outlet tube and the flow director are shaped and sized so that the outlet tube is held within the flow director by the friction forces between the outlet tube and the flow director.

It can be advantageous in some applications to fasten the flow director to the outlet tube so that the flow director cannot be subsequently removed from the outlet tube. In this case, preferably the flow director is fastened to the outlet tube without the use of a material which is different from the materials of the flow director and outlet tube. For example, preferably, the flow director is fastened to the outlet tube through the use of a welding technique, for example, ultrasonic or heat welding. However, it will be appreciated that the flow director can be fastened to the outlet tube through the use of a third party material such a bonding agent, for example an adhesive.

Preferably, the flow director comprises a plurality of vanes which are arranged around the axis of the housing and inclined to that axis so that incoming gas is made to follow a generally helical path within the housing, in which the vanes are arranged in an array around the outlet tube. It has been found that the position of the shield relative to the outlet tube and the vanes can affect the efficiency of the assembly. If the shield is located too far away from the outlet port then a significant proportion of gas traveling away from the shield can miss the outlet tube. If the shield is located too close to the outlet port then the advantages of accelerating the cyclone, when the face of the shield which is directed towards the upper end of the housing is bowl-shaped, can be lost. Preferably, when the face of the shield which is directed towards the upper end of the housing is bowl-shaped, the ratio of the distance between the vanes and the bottom of the shield to the distance between the end of the outlet tube which faces the shield and the bottom of the shield is at least about 1, more preferably at least about 1.2, especially preferably at least about 1.5, for example at least about 1.7. Preferably, the ratio of the distance between the vanes and the bottom of the shield to the distance between the end of the outlet tube which faces the shield and the bottom of the shield is not more than about 2.5, more preferably not more than about 2.2, especially preferably not more than about 2, for example not more than 1.8.

Preferably, the assembly includes a flow deflector so that gas flowing into the housing flows over the flow deflector so that the incoming gas is forced toward the side walls of the housing. Preferably, the flow deflector is located downstream of the flow director, so that the gas stream flowing into the housing flows over the flow director first, and then flows over the flow deflector. Accordingly, preferably, the flow deflector is located on the side of the flow director that is distal to the inlet port.

Preferably, the flow deflector extends annularly around the outlet tube. Preferably, the flow deflector comprises a ledge portion proximal the flow director which extends away from the outlet tube, substantially perpendicularly to the axis of the housing. Preferably, the flow conduit device further comprises an edge portion which extends away from the free end of the ledge portion, in a direction substantially parallel to the axis of the housing.

Preferably, the flow deflector is fastened to the outlet tube. The flow deflector and the outlet tube can be provided as a single piece. For example, the flow deflector and the outlet tube can be created from a single mould. This can enable easy manufacturing and putting together of the assembly. The flow deflector and the outlet tube can be provided as separate pieces, which can be fastened together. This can allow different flow deflector to be used with different outlet tubes.

If the outlet tube is formed separately from the flow deflector, then preferably the flow deflector and the outlet tube are formed form the same material. Preferably, the flow deflector outlet tube can be fastened to the outlet tube so that it can be subsequently removed. For example, preferably the flow deflector is fastened to the outlet through the use of a mechanical fastening such as a latch, co-operating screw threads, or engaging bayonet formations. More preferably, the outlet tube and the flow deflector are shaped and sized so that the outlet tube is held within the flow deflector by the friction forces between the outlet tube and the flow deflector.

It can be advantageous in some applications to fasten the flow deflector to the outlet tube so that the flow deflector cannot be subsequently removed from the outlet tube. In this case, preferably the flow deflector is fastened to the outlet tube without the use of a material which is different from the materials of the flow director and outlet tube. For example, preferably, the flow deflector is fastened to the outlet tube through the use of a welding technique, for example, ultrasonic or heat welding. However, it will be appreciated that the flow deflector can be fastened to the outlet tube through the use of a third party material such a bonding agent, for example an adhesive.

Preferably the flow deflector is formed from a polymeric material. Preferred polymeric materials include polyolefins (especially polyethylene and polypropylene), polyesters, polyamides, polycarbonates and the like. Polymeric materials used for the flow deflector can be reinforced, for example by fibrous materials (especially glass fibers or carbon fibers). Materials other than polymeric materials can be used, for example metals.

Preferably the flow deflector is formed by moulding, for example, by injection moulding.

The outlet tube and the flow conduit device can be provided as a single piece. For example, the outlet tube and the flow conduit device can be manufactured from a single mould. The outlet tube and the flow conduit device can be provided as separate pieces which can be fastened together at their ends. This can increase the flexibility of the assembly as different outlet tubes can be used with different flow conduit devices.

If the outlet tube is formed separately from the flow conduit device, then the interface between the outlet tube and the flow conduit device should form a fluid tight seal. Preferably, the outlet tube and the flow conduit device are formed form the same material. Preferably, the outlet tube can be fastened to the flow conduit device so that it can be subsequently removed. For example, preferably the outlet tube is fastened to the flow conduit device through the use of a mechanical fastening such as a latch, co-operating screw threads, or engaging bayonet formations. More preferably, the outlet tube and the flow conduit device are shaped and sized so that the outlet tube is held within the flow conduit device by the friction forces between the outlet tube and the flow conduit device.

It can be advantageous in some applications to fasten the outlet tube to the flow conduit device so that the outlet tube cannot be subsequently removed from the flow conduit device. In this case, preferably the outlet tube is fastened to the flow conduit device without the use of a material which is different from the materials of the flow conduit device and outlet tube. For example, preferably, the outlet tube is fastened to the flow conduit device through the use of a welding technique, for example, ultrasonic or heat welding. However, it will be appreciated that the outlet tube can be fastened to the flow conduit device through the use of a third party material such a bonding agent, for example an adhesive.

When the material is to be removed from the gas stream by a filtration medium, preferably the assembly includes a tubular filter element having a wall of a filtration medium which defines a hollow space within it so that the gas stream flows through its wall, and in which the flow conduit device communicates at its second end with the hollow space within the filter element.

Preferably, the seal between the wall of the primary chamber and the flow conduit device is located at or towards the second end of the primary chamber and at the second end of the flow conduit device. The location of the seal between the flow conduit device (and the filter element when the assembly includes a filter element and the flow conduit device is provided on the filter element) and the head part of the housing towards the end of the flow conduit device where the gas stream flows from it into the housing, or vice versa depending on the mode of operation, can be advantageous. For example, when the assembly includes a tubular filter element, then this can facilitate the formation of the seal, compared to the formation of a seal between a flow conduit device and a filter element when the seal is located remote from the filter element, for example between the free ends of tubular extensions on the head part of the housing and the filter element respectively.

The formation of the seal is also facilitated by the present invention because the seal can be provided as an O-ring which is arranged in a plane which is perpendicular to the axis along which the filter element is moved relative to the flow conduit device. This can help to enhance the reliability of the seal that is formed.

In many applications, the angle between the axis of the chamber port in the housing head part and the axis of the tubular filter element will be not more than about 150° (the angle being 180° when the axes are coincident). Frequently, the angle between the said axes might be not more than about 120°. The angle will often be at least about 30°, especially at least about 60°. It will generally be desirable for the axis of the chamber port to be approximately perpendicular to the axis of the filter element. The angle between the axis of the chamber port in the housing head part and the axis of the tubular filter element need not be the same as the angle between the axis of the flow conduit device at the first end and the axis of the flow conduit device at the second end. Generally, the angle between the axis of the chamber port in the housing head part and the axis of the tubular filter element will be not less than the angle between the axis of the flow conduit device at the first end and the axis of the flow conduit device at the second end.

Preferably, the portion of the flow conduit device between the seal and the second end thereof defines a flow path for the gas stream which is generally straight and aligned with the axis of the filter element. The portion of the flow conduit device which extends between the seal and the first end will define a portion of the flow path which is not straight. For example, this portion of the flow path might be curved.

Preferably, the flow conduit device has an extension which extends towards a recess within the primary chamber, and in which the assembly includes an auxiliary seal between the external surface of the extension and the internal wall of the primary chamber to define an auxiliary chamber in the recess, which is isolated by the auxiliary seal from the remainder of the primary chamber.

The wall of the chamber recess can have a vent formed in it so that the auxiliary chamber communicates with gas on the opposite side of the filter element from gas that is within the primary chamber.

The wall of the flow conduit device extension can have a vent formed in it which communicates with the auxiliary chamber.

The auxiliary chamber can contain a device for measuring the difference between the pressure in gas which is flowing towards the filter element and the pressure in gas which has passed through the filter element. Suitable measuring devices are known. A preferred device can comprise an expandable bladder, in which the degree of expansion depends on the pressure differential being measured, and which is arranged to cause translation of a magnet as it expands and contracts. The position of the magnet can be monitored remotely, and corresponds to the pressure differential that is being measured. Suitable differential pressure measuring devices are known in existing products, for example in products sold by Domnick Hunter Limited under the trade mark OIL-X.

The seal between the flow conduit device extension and the wall of the chamber (especially the internal wall) can be provided by an O-ring. Preferably, the flow conduit device extension has a groove formed in its surface (especially its external surface) and the groove contains an O-ring.

It can be preferred for the O-ring on the flow conduit device plane to be arranged in a plane, and in which the plane of the O-ring is inclined to the axis of the second end of the flow conduit device. This can give rise to advantages when the recess within the chamber and the second end of the flow conduit device are axially on opposite sides of the port in the housing head part because it can allow the size of the head part to be reduced compared with the size when the plane of the O-ring is perpendicular to the axis of the second end of the flow conduit device. Preferably, the angle between the plane of the O-ring and the axis of the second end of the flow conduit device is at least about 95°, for example at least about 100°.

Particularly when the assembly is intended to operate with gas flowing outwardly through the wall of the filter element from the hollow space within it, the filter element can have an end cap which includes an inlet tube extending from the inlet in the end cap into the hollow space. The inlet tube can aid the even distribution of gas through the wall of the filter element. Preferably the inlet and the inlet tube are co-axial with the end cap, however, it will be appreciated that this need not be the case. A filter element which incorporates an inlet tube is disclosed in PCT Application No. WO-A-04/09210. Subject matter that is disclosed in that document is incorporated in the specification of the present application by this reference.

Preferably, the inlet tube is approximately straight, at least in the portion of its length that is within the hollow space. Preferably the ratio of the length of the tube (measured from the inner surface of the end cap on which the tube is mounted) to the length of the filter element (measured between the inner surface of the opposite end caps) is at least about 0.15, more preferably at least about 0.20, especially at least about 0.25.

The end cap can have an opening extending around the periphery of the inlet tube for supply of the gas stream to the element wall close to the end cap. This can be advantageous as it can aid the even distribution of contaminant material across the element wall.

The inlet tube can be formed integrally with the end cap, or can be formed separately and subsequently fastened to the end cap.

It can be advantageous to form the inlet tube separately as it allows the for the production of a variety of different inlet tubes that can be fastened to standard end caps. However, it can also be advantageous to form the end cap and the inlet tube as one piece as this can reduce manufacturing costs. This can especially be the case if a variety of different inlet tubes are not used in different applications.

If the inlet tube is formed separately from the end cap, then the interface between the end cap and the inlet tube should form a fluid tight seal. Preferably, the tube and the end cap are formed form the same material. Preferably, the inlet tube can be fastened to the end cap so that it can be subsequently removed. For example, preferably the inlet tube is fastened to the end cap through the use of a mechanical fastening such as a latch, co-operating screw threads, or engaging bayonet formations. More preferably, the inlet tube and the end cap are shaped and sized so that the inlet tube is held within the end cap by the friction forces between the inlet tube and the end cap.

It can be advantageous in some applications to fasten the inlet tube to the end cap so that the inlet tube cannot be subsequently removed from the end cap. In this case, preferably the inlet tube is fastened to the end cap without the use of a material which is different from the materials of the end cap and inlet tube. For example, preferably, the inlet port is fastened to the first end cap through the use of a welding technique, for example, ultrasonic or heat welding. However, it will be appreciated that the inlet port can be fastened to the first end cap through the use of a third party material such a bonding agent, for example an adhesive.

The inlet tube can have at least one helically extending rifle formation in its internal wall by which a helical flow is imparted to the gas stream when it leaves the tube. This can facilitate a more even distribution of contaminant material in the gas stream over the length of the filter element. Furthermore, primary separation of liquid droplets from the gas stream can be facilitated as a result of the helical flow of gas entering the element. Details of a filter element having an inlet tube with at least one helically extending rifle formation in its internal wall are disclosed in the co-pending PCT application filed with the present application which claims priority from UK Patent Application No. 0417457.9. Subject matter that is disclosed in that application is incorporated in the specification of the present application by this reference.

The inlet tube can have at least one opening in its side wall. Preferably, the inlet tube has an upstream band, a middlestream band and a downstream band, the said bands being axially adjacent to one another and non-overlapping, having equal axial lengths of at least 5% of the length of the inlet tube, and being arranged such their planes are perpendicular to the axis of the inlet tube, and in which the proportion of the area of the side wall that is open in the upstream band is smaller than that in the middlestream band, and the proportion of the area of the side wall that is open in the middlestream band is smaller than that in the downstream band. This can help ensure that the supply of gas into the filter element is graded, which can lead to a more even distribution of gas flowing through the element wall. Details of a filter element having an inlet tube with at least one opening in its side wall are disclosed in the co-pending PCT application filed with the present application which claims priority from UK Patent Application No. 0417462.9. Subject matter that is disclosed in that application is incorporated in the specification of the present application by this reference.

Materials suitable for use in a filtration filter element will be selected according to the nature of the gas that is being filtered, the nature of the contaminants (liquid droplets, aerosols, solid particles etc) to be filtered from the gas, the pressure differential across the filter and so on. Such materials are known, including those used by Domnick Hunter Limited in products which are available under the trade mark OIL-X. Suitable materials for use as a filtration medium (or a filtration layer) include, borosilicate and other glass fibers, activated carbon minerals, activated silica materials and so on. A filtration layer can be made from woven fibers. However, as will be appreciated, a filtration layer can be made from sheets of non-woven fibers. For example, a microfiber filtration layer made from fine organic or inorganic fibers is preferred. Preferably, a coarser fiber layer is fitted on the inside of a microfiber filtration layer. This coarser layer can protect a microfiber filtration layer from gross pollution.

Preferably, the filtration layer can comprise a layer of a material which has been folded so that it is fluted (or pleated). This can increase the surface area of the filtration layer through which air flowing through the filter element will pass. This can also help to increase the rigidity of the filtration layer.

The filtration layer can be surrounded by an "anti-reentrainment" or drainage layer on its outside. Drainage layers are especially used in filter elements where the nature of the contaminants to be filtered from the gas is in the form of aerosols, or liquid droplets. The drainage of filter element can be any material that is capable of retaining liquid that has been coalesced by the filtration layer, and is carried to the drainage layer by a gas stream that flows through the drainage layer. The drainage layer of the filter element will generally be porous, and made from a material which encourages flow of coalesced liquid towards the base of the filter element. Factors affecting the drainage characteristics include pore size and structure, and the material of the drainage layer, including for example the surface energy of liquid which is in contact with the material. Materials suitable for use in the drainage layer are used in similar products sold by Domnick Hunter Limited under the trade mark OIL-X. Suitable materials include open-celled foam plastics, felted fabric material, and expanded foam materials.

The element can include at least one support for the filtration layer. This can help to retain the filtration layer in its position within the filter element. This can also increase the rigidity of the filter element. A support can be provided within the hollow space, positioned against the internal surface of the filtration layer. A support can be positioned outside the filtration layer, for example between the filtration layer and the drainage layer. Preferably, a first support made of a rigid material is positioned within the hollow space against the internal surface of the filtration layer, and a second support made of rigid material is positioned outside the filtration layer. Preferably, the or each support is perforated to allow a gas stream to flow therethrough. The material for the support should have sufficient rigidity to withstand the forces to which the element is exposed, during assembly of the element and an assembly containing the element, and during use. The material can be metallic, for example a stainless steel.

Preferably, the filter element has a substantially constant cross-sectional shape along its length. Preferably, the cross-section of the filter element is generally round. For example, the filter element may be circular or elliptical. However, it will be appreciated that the cross-section of the filter element need not be round. For example, the cross-section could be the shape of a square, triangle, or any other regular or irregular shape.

The shape of the filter element when viewed along its axis (its cross-section shape) will generally be approximately constant over at least most of the length of the element. However, it will be appreciated that its cross-section shape need not be constant. For example, the filter element could be conical or pyramidal.

Generally, the filter element will include first and second end caps at opposite ends of the wall of the filtration medium, with the inlet provided on the first end cap. Generally, the filter element will be arranged in use with the first end cap located above the second end cap, when the first end cap might be referred to as the top end cap, and the second end cap referred to as the bottom end cap.

The cross-sections of the end caps and the wall at their interfaces should be broadly the same so that the end caps can be fitted together with the wall to provide fluid tight seals. Preferably, the filtration and drainage layers are retained and sealed within a trough which is provided in the first end cap, so that there is no path for gas to flow past the filtration medium.

When a second end cap is provided, it can be preferred for the filtration layer to be retained and sealed within a trough which is provided in the second end cap, so that there is no path for gas to flow past the filtration medium. Preferably, the drainage layer extends from the wall of the filter element over at least a part of the external surface of second end cap, over the face thereof which faces away from the first end cap. This can facilitate drainage of coalesced fluid from the drainage layer of the filter element, into a reservoir in the assembly from which it can be collected, for example for disposal. Details of a filter element in which the drainage layer extends from the wall of the filter element over at least a part of the external surface of second end cap, over the face thereof which faces away from the first end cap are disclosed in the co-pending PCT application filed with the present application which claims priority from UK Patent Application No. 0417455.3. Subject matter that is disclosed in that application is incorporated in the specification of the present application by this reference.

When a second end cap is provided, and when the drainage layer extends from the wall of the filter element over at least a part of the external surface of second end cap, over the face thereof which faces away from the first end cap, the part of the drainage layer between the second end cap and the housing can be compressed by at least one longitudinally extending fin. This can facilitate drainage of coalesced fluid from the drainage layer of the filter element, into a reservoir in the assembly from which it can be collected, for example for disposal. The effective engagement of the housing wall with the second end cap, through the fin and the drainage layer, can also help to locate the filter element in the housing transversely. This can facilitate the formation of a reliable seal between the housing and the filter element which might otherwise be disturbed if the element is able to move transversely within the housing. The transverse location of the element in the housing operates in conjunction with the axial location provided by the interengaging rib and groove. Details of a filter assembly in which the part of the drainage layer between the second end cap and the housing are compressed by at least one longitudinally extending fin are disclosed in the co-pending PCT application filed with the present application which claims priority from UK Patent Application No. 0417459.5. Subject matter that is disclosed in that application is incorporated in the specification of the present application by this reference.

The filtration medium (or one or more layers thereof) can be sealed to an end cap using a quantity of a bonding material such as an adhesive. The bonding material should be selected according to fluids with which the element will come into contact when in use so that there are no adverse reactions between the bonding material and the fluids. The filtration medium might be sealed to an end cap using other techniques such as welding, for example by localized application of heat, or by ultrasonic welding.

The drainage medium (or one or more layers thereof) can be sealed to an end cap using a quantity of a bonding material such as an adhesive. The bonding material should be selected according to fluids with which the element will come into contact when in use so that there are no adverse reactions between the bonding material and the fluids. The drainage medium might be sealed to the first end cap using other techniques such as welding, for example by localized application of heat, or by ultrasonic welding.

Preferably one or each of the end caps is formed from a polymeric material. Preferred polymeric materials include polyolefins (especially polyethylene and polypropylene), polyesters, polyamides, polycarbonates and the like. Polymeric materials used for the end caps can be reinforced, for example by fibrous materials (especially glass fibers or carbon fibers). Materials other than polymeric materials can be used, for example metals. The first and second end caps will generally be formed from the same material or materials.

Preferably one or each of the end caps is formed by moulding, for example, by injection moulding.

The housing should provide an inlet port for a gas stream to flow into the housing, and an outlet port through which gas which has passed through the filtration medium can leave the housing. The ports will generally be provided in the housing head.

Preferably, the housing includes a reservoir in which coalesced liquid which drains from the drainage layer can collect. The reservoir can be provided by a space within the housing below the filter element.

Preferably, the housing includes a drain outlet for coalesced liquid which drains from the drainage layer. The outlet will generally provide for removal of liquid which has collected in a reservoir. The drain should preferably be capable of opening without depressurizing the housing. A suitable drain mechanism is disclosed in European Patent No. EP-A-0081826.

The housing should be formed from a material which is capable of withstanding the internal pressures to which it is subjected when in use. Metals will often be preferred, for example aluminum and alloys thereof, and certain steels.

Preferably, the filter element has an the end cap with an opening (an inlet when the assembly is operating in an in-to-out mode) through which gas flows between the flow conduit device and the hollow space within the filter element, and which defines an end of the hollow space, and the filter element fits into the body part of the housing. The head part and the body part can have interengaging formations in the form of at least one rib and at least one groove, arranged so that the rib can be slid into the groove when the filter element is fitted into the body part, and so that the filter element rotates with the body part relative to the head part. For example, the end cap can have at least one rib which is received in an appropriate recess (for example a groove or a slot) in a housing. When the end cap has the rib, this can also facilitate the loosening of the filter element from the housing head part when the housing body is rotated relative to the housing head part. Details of a filter assembly in which the end cap has at least one rib that is received within an appropriate recess in the housing are disclosed in the co-pending PCT application filed with the present application which claims priority from UK Patent Application Nos. 0417463.7 and 0428567.2. Subject matter that is disclosed in that application is incorporated in the specification of the present application by this reference.

In another aspect, the invention provides a tubular filter element for collecting material that is entrained in a gas stream, which has a wall which defines a hollow space within it so that a gas stream can flow through the wall to be filtered, the filter element having a flow conduit device with a first end directed outwardly, in use towards a port in a housing for the element, and a second end which is directed towards the hollow space within the element, the element being configured to form a seal between the flow conduit device and an adjacent wall of a housing, in a region of the flow conduit device that is at or close to the second end thereof. Features of the filter element of this aspect of the invention are common to the filter element which forms part of the assembly of the invention.

In a further aspect, the invention provides an assembly for collecting material that is entrained in a gas stream, which comprises a tubular filter element having a wall of a filtration medium which defines a hollow space within it, arranged for the gas stream to flow through its wall, and a housing in which the filter element is located, the housing comprising a head part and a body part in which the filter element is located and having inlet and outlet ports for the gas that is to be filtered, in which:

a. at least one of the ports is provided in the head part, and the head part has internal walls which define a primary chamber within it communicating with the said port and with the hollow space within the tubular filter element, with the axis of the port and the axis of the tubular filter element being non-aligned, b. the filter element includes a flow conduit device having a first end which is directed generally towards the port in the housing and a second end which is directed towards the hollow space within the tubular filter element, the assembly including a seal between the wall of the primary chamber at or towards the free end thereof and the flow conduit device at the second end thereof, the flow conduit device extending from the hollow space into the primary chamber and being configured to reduce turbulence in the flow of gas within the said chamber between the port and the hollow space resulting from the non-alignment of the said axes.

In another further aspect, the invention provides a separator assembly for collecting material that is entrained in a gas stream, which comprises:

a. a housing having a head part and a body part, and inlet and outlet ports for the gas that is to be filtered, in which at least the outlet port is provided in the head part which has internal walls which define a primary chamber within the head part having a first end communicating with the outlet port and an opening at a second end, in which the axes of the first and second ends of the primary chamber are non-aligned, b. a flow conduit device having a first end which can fit into the primary chamber in the head part of the housing through the opening at the second end so that it is directed generally towards the outlet port in the housing and a second end which is directed towards the body part of the housing to provide a conduit for gas to flow between the body part of the housing and the outlet port, the flow conduit device being configured to reduce turbulence in the flow of gas within the said chamber between the outlet port and the body part of the housing resulting from the non-alignment of the said axes, c. an outlet tube extending from the second end of the flow conduit device into the housing body through which gas flows between the housing body and the outlet port, and d. a flow director located downstream of the inlet port so that gas flowing into the housing flows over the flow director and so that the incoming gas is made to follow a generally helical path within the housing, in which the assembly includes a seal between the wall of the primary chamber in the head part of the housing and the flow conduit device.

Preferably, the separatory assembly relies wholly on centrifugal forces provided by the helical flow path to remove material from the gas stream, rather than relying on a filter element.

BRIEF DESCRIPTION OF THE DRAWINGS

Embodiments of the invention will now be described, by way of example only, and with reference to the accompanying drawings, in which:

FIG. 18b is a schematic perspective view of the second piece of the two piece flow conduit device shown in FIG. 18a.

DETAILED DESCRIPTION OF THE PREFERRED EMBODIMENT

Figure 1:
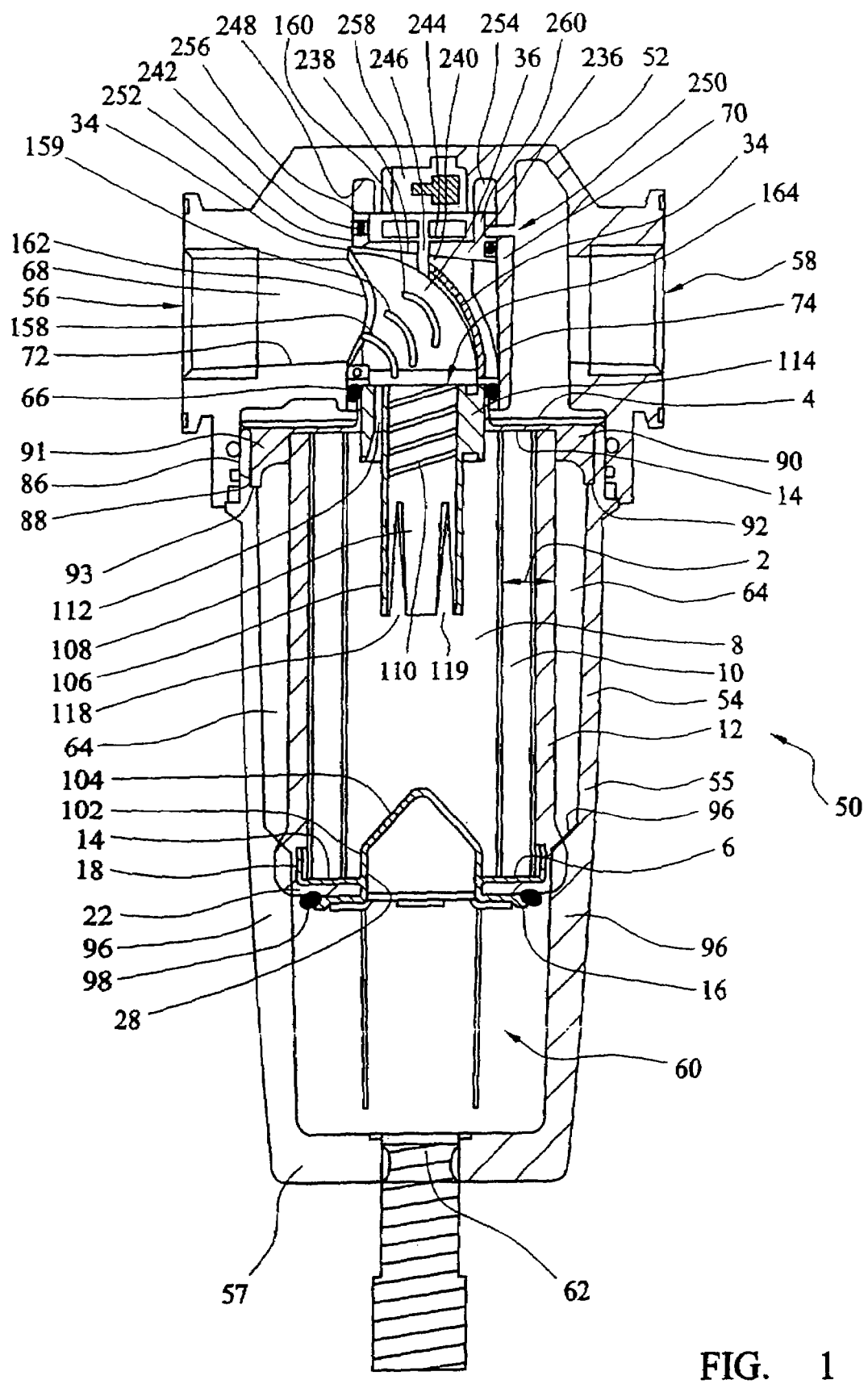
FIG. 1 is sectional side elevation through an apparatus for removing material entrained in a gas stream according to the present invention which utilizes a filtration medium to remove material entrained in a gas stream, and which comprises a filter element and the housing in which the element is located when in use.

Referring to the drawings, FIGS. 1 to 18 illustrate one embodiment of an assembly for removing material entrained in a gas stream according to the present invention. The assembly shown is a filter assembly which utilizes a filtration medium to remove the material from the gas stream. As will be appreciated, other types of assemblies according to the present invention can be utilized for removing material entrained in a gas stream, such as a separator assembly as described below with reference to FIGS. 19 to 24.

Figure 2:
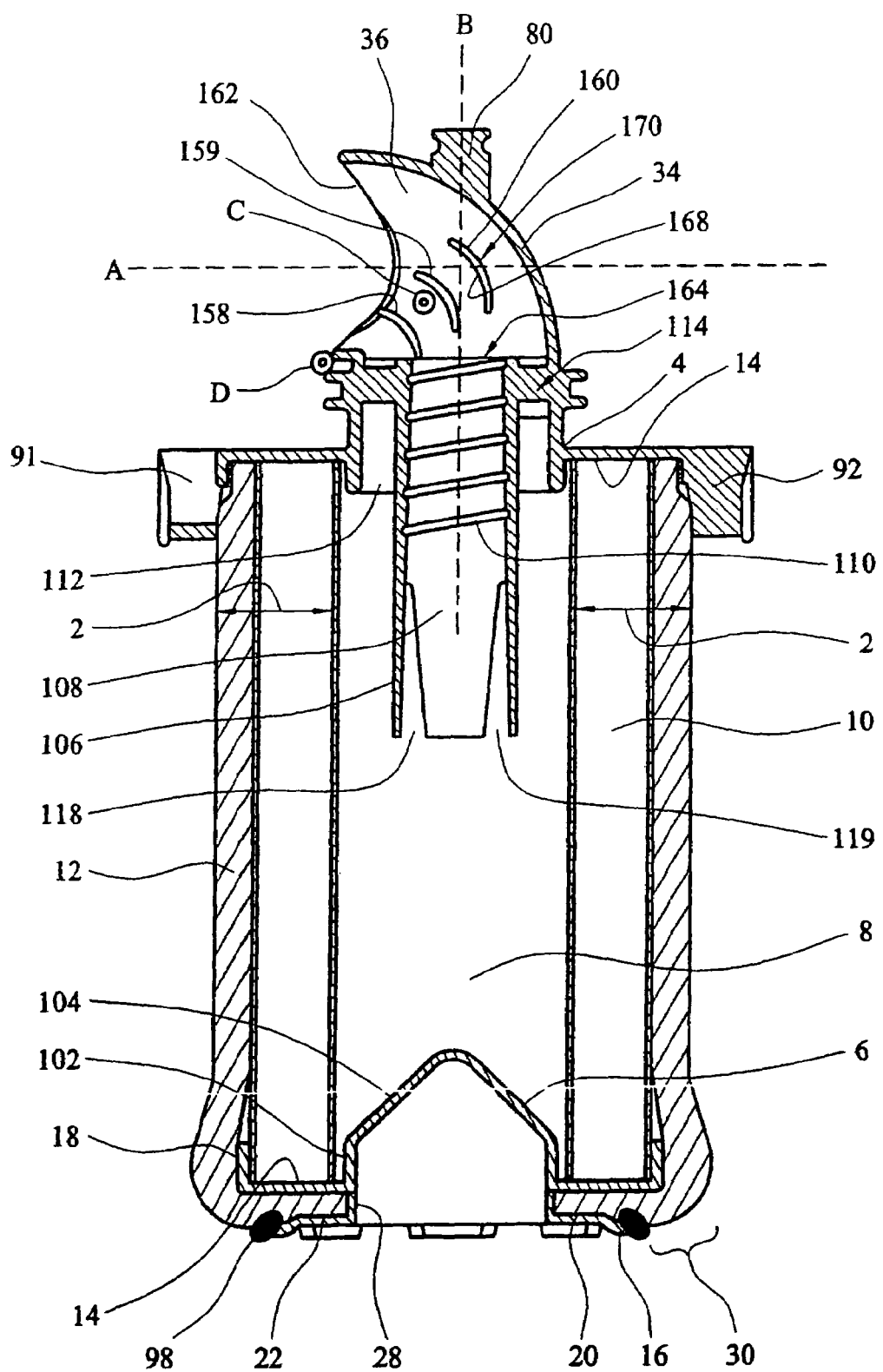
FIG. 2 is a sectional side elevation through a filter element according to the present invention.

FIG. 2 shows a filter element which comprises a cylindrical wall section 2 formed from a filter medium and top and bottom end caps 4 and 6.

The wall section 2 defines a hollow space 8 within it. The filter medium of the wall 2 comprises a cylindrical filtration layer 10 and a cylindrical anti-reentrainment layer or drainage layer 12 which fits snugly around the filtration layer on the outside of the filter element.

The top end cap 4 contains a flow conduit device 34 which defines a flow path 36 for gas which is to be filtered. The flow conduit device 34 has a port 80 in it for connection to a gauge for measuring the differential pressure across the filter element.

When the filter element is located within a housing (described in more detail below) the port 80 can be received in a downwardly facing socket in the housing head, forming a seal by compression of an O-ring between the external surface of the port and the internal surface of the socket.

The flow conduit device 34 has a first opening 162 having a first axis A, and a second opening 164 having a second axis B. The angle between the axes A, B of the first 162 and second 164 openings is 90°. The flow conduit device 34 provides a continuous flow path between the two openings, and therefore provides a smooth change of direction for gas flowing therethrough when in use. The flow conduit device 34 turns about an axis D which extends perpendicularly to the axes A, B of the first 162 and second 164 conduit openings. (As shown in FIG. 2, the axis D about which the flow conduit device 34 turns extends perpendicularly to the plane along which the cross-section of FIG. 2 of the filter element is taken).

The flow conduit device 34 contains first 158, second 159 and third 160 curved vanes extending perpendicularly across the flow conduit device. Each vane curves around its own axis and the radius of curvature is the same for each vane. Further, the length of the vanes, measured between their leading and trailing edges, is the same for each vane. The axes around which the vanes curve extend perpendicularly to the axes A, B of the first and second conduit openings 162, 164. For example, as shown in FIG. 2, the second vane 159 curves around an axis C which extends parallel to the axis D about which the flow conduit device 34 turns. The vanes each have concave 168 and convex 170 surfaces, wherein the concave surface of each vane faces the first 162 and second 164 openings of the flow conduit device 34. Therefore, the vanes help guide the flow of gas between the first 162 and second 164 openings.

Figure 11:
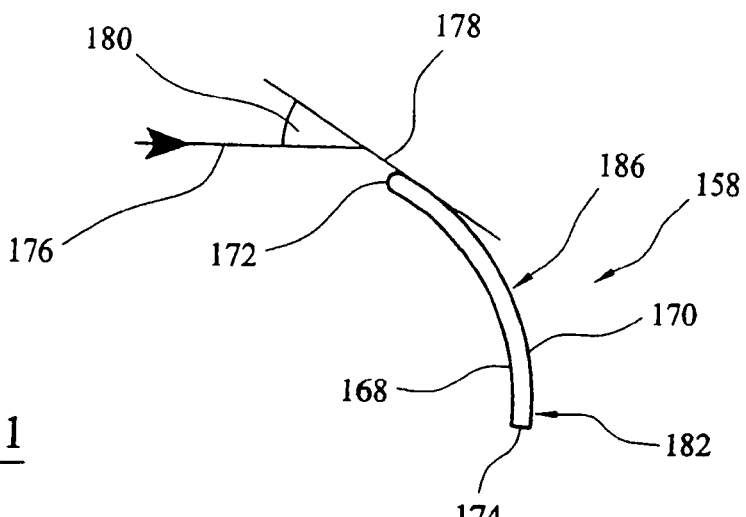
FIG. 11 is a sectional elevation of the first vane of the filter element shown in FIG. 2.

The shape and configuration of the first 158, second 159 and third 160 vanes is identical and shown in more detail with reference to the first vane 158 in FIG. 11. As shown, the first vane 158 has a rounded leading edge 172 which faces into the direction of the flow of gas 176 when the filter element is in use, and a trailing edge 174. The thickness of the first vane 158 is substantially constant between its leading and trailing edges. The vane has a straight portion 182 proximal its trailing edge 174, and a curved portion 186 extending between its leading edge and the straight portion. The length of the straight portion 182 is 5% of the total length of the vane 158 between its leading 172 and trailing 174 edges. The angle of incidence of the vane to the flow of gas when in use (i.e. the angle 180 between a straight line 176 projecting parallel to the direction of the flow of gas immediately upstream of the vane 158 and a straight line 186 projecting tangentially from the convex surface 170 of the vane at its leading edge 172) is 4°.

Figure 12:
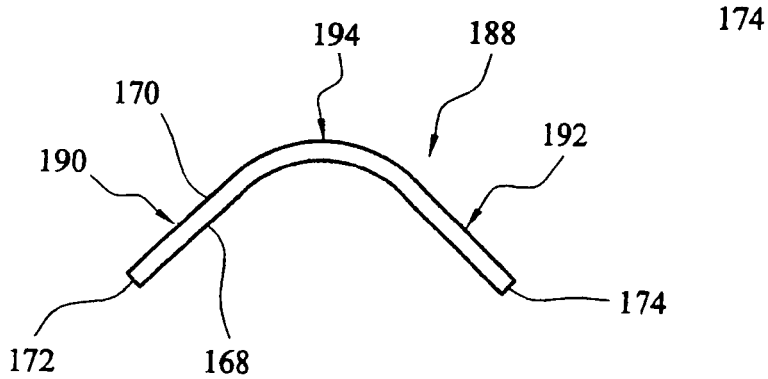
FIG. 12 is a sectional elevation of the first vane of the filter element shown in FIG. 2 according to a second embodiment.

The first 158, second 159 and third 160 vanes need not have the shape and configuration of the vane shown in FIG. 11. For example, the vanes can have the shape and configuration of an elbow shaped vane 188 as shown in FIG. 12. The elbow shaped vane 188 is substantially similar in configuration to that shown in FIG. 11 and like parts share like reference numerals. However, the elbow vane 188 has a straight leading portion 190 proximal its leading edge 172, as well as a straight trailing portion 192 proximal its trailing edge 174 and a curved portion 194 between them.

Figure 13:
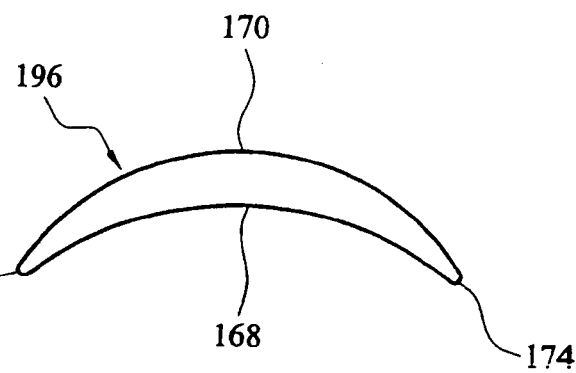
FIG. 13 is a sectional elevation of the first vane of the filter element shown in FIG. 2 according to a third embodiment.

Further, the first 158, second 159 and third 160 vanes can have the shape and configuration of the crescent shaped vane 196 shown in FIG. 13. The crescent shaped vane 196 is substantially similar in configuration to that shown in FIG. 11 and like parts share like reference numerals. However, the thickness of the crescent shaped vane 196 is not uniform between its leading 172 and trailing edges 174. Instead, the thickness of the crescent shaped vane 196 continuously increases as you travel from its leading edge 172 towards the midpoint between the leading and trailing 174 edges, and continuously decreases as you travel from the midpoint to the trailing edge.

Figure 14:
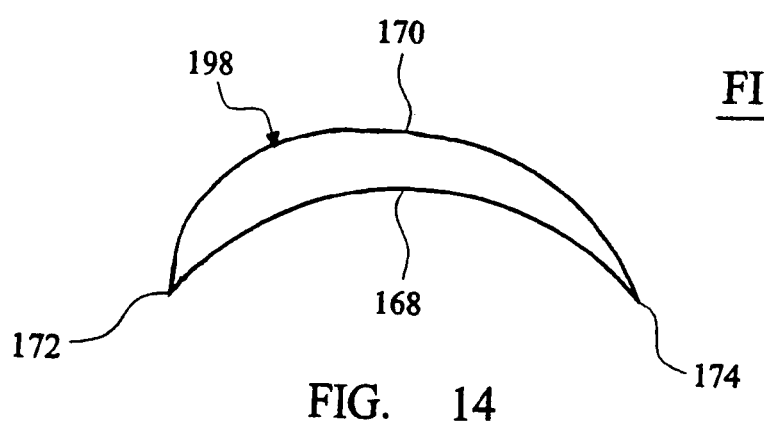
FIG. 14 is a sectional elevation of the first vane of the filter element shown in FIG. 2 according to a fourth embodiment.

Further still, the first 158, second 159 and third 160 vanes can have the shape and configuration of the curved-aerofoil shaped vane 198 shown in FIG. 14. The curved-aerofoil shaped vane 198 is similar in configuration to that shown in FIG. 11 and like parts share like reference numerals. However, the thickness of the curved-aerofoil shaped vane 196 is not uniform between its leading 172 and trailing 174 edges and is generally thicker towards its leading edge than towards its trailing edge.

Referring now back to FIG. 2, the gap/chord ratio of the first 158, second 159 and third 160 vanes shown in FIG. 2, is 0.45.

The first 158, second 159 and third 160 vanes are arranged such that radius ratio of all of the sub-flow conduit devices (described in more detail below in relation to FIG. 17) is at least 1.

The first 158, second 159 and third 160 vanes are arranged such that aspect ratio for all the sub-flow conduit devices is at least 1.

Figure 15:
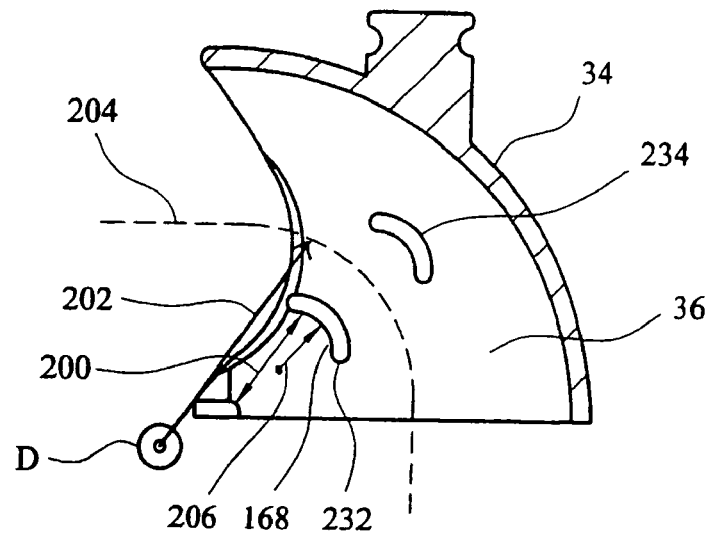
FIG. 15 is a sectional elevation view of a flow conduit device according to the invention illustrating the calculation of the position of the first vane.
Figure 16:
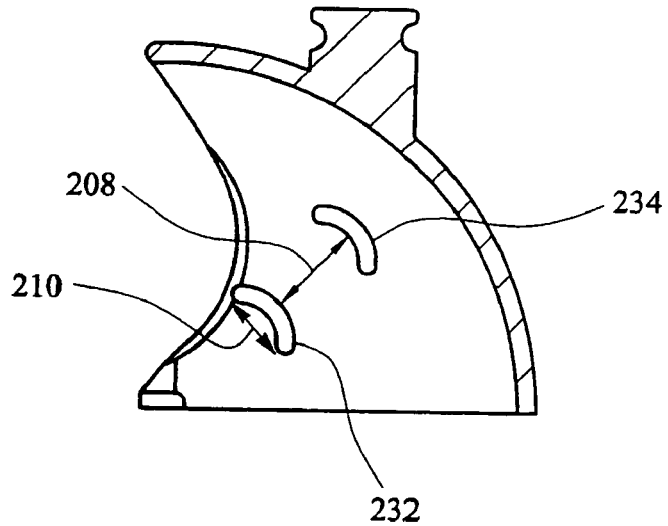
FIG. 16 is a sectional elevation view of the flow conduit device shown in FIG. 15 illustrating the calculation of the gap/chord ratio of the vanes.
Figure 17:
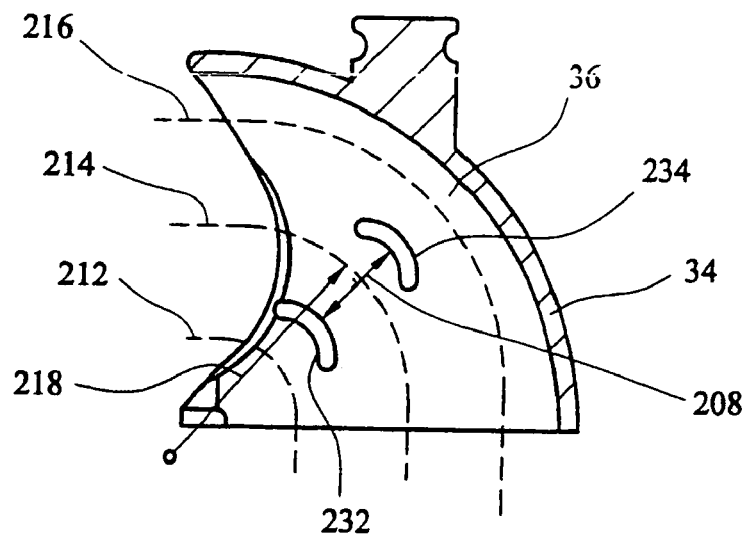
FIG. 17 is a sectional elevation view of the flow conduit device shown in FIG. 15 illustrating the calculation of the radius ratio and the aspect ratio of the sub-flow conduit devices defined by the vanes.

FIGS. 15 to 17 illustrate how the preferred distance between the concave surface of the inner most vane and wall of the flow conduit device the concave surface of the vane faces, the gap/chord ratio, and the radius ratio and aspect ratio for a flow conduit device with vanes, can be calculated. For sake of simplicity of illustration, the flow conduit devices 34 of FIGS. 15 to 17 contain only a first vane 232 and a second vane 234. Otherwise, all other parts of the flow conduit device 34 of FIG. 15 are the same as that shown in FIG. 2 and share the same reference numerals.

As illustrated in relation to FIG. 15, the preferred positioning of the inner most vane (i.e. the first vane 232) can be calculated so that the distance 200 between its concave surface 168 and wall of the flow conduit device the concave surface of the vane faces, is equal to: $R - r \cos\theta/2$, where $(R)$ is the radius of the curvature 202 of the centre line 204 of the turn of the flow conduit device 34, $(r)$ is the radius of the curvature 206 of the first vane 232, and $\theta$ is the angle between the axes of the first 162 and second 164 conduit openings (i.e. 90° as shown in FIGS. 2 and 15).

As illustrated in relation to FIG. 16, the gap/chord ratio is calculated as the ratio of the distance 208 between the midpoints of the first 232 and second 234 vanes, and the chords 210 of the vanes.

As illustrated in relation to FIG. 17, the first 232 and second 234 vanes divide the flow conduit device 34 into first, second and third sub-flow conduit devices having first 212, second 214 and third 216 centre line of turns respectively. The radius ratio of the second sub-flow conduit device having a centre line of turn 214, is calculated as the ratio of the radius of the curvature 218 of the centre line of the turn 214 of the second sub-flow conduit device to the width 208 of the sub-flow conduit device measured between the first 232 and second 233 vanes.

Figure 4:
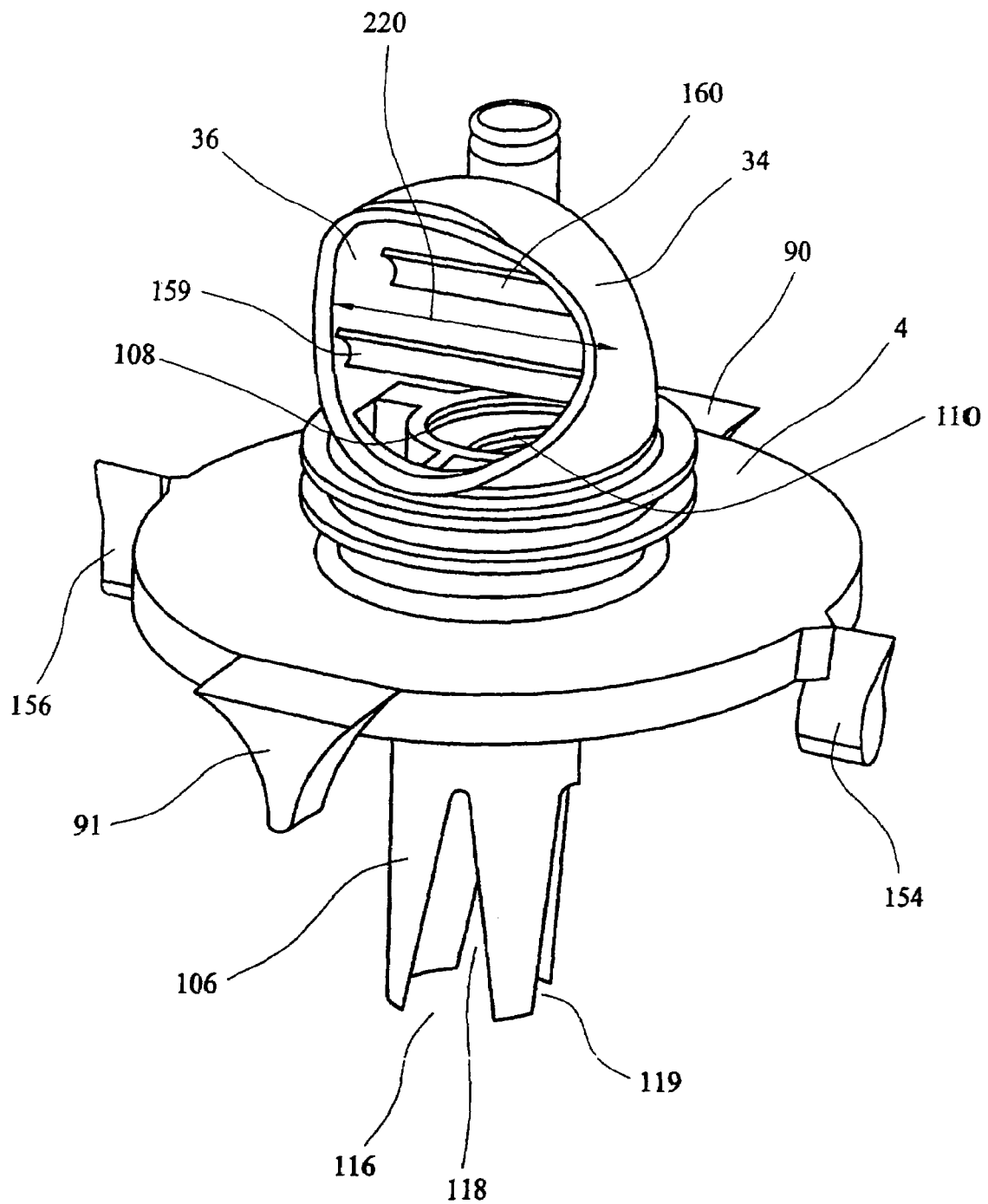
FIG. 4 is a schematic perspective view of the top end cap of the filter element shown in FIG. 2.

Still referring to FIG. 17, the aspect ratio of the second sub-flow conduit device having a centre line of turn 214 is calculated as the ratio of the depth of the second sub-flow conduit device to the width 208 of the second sub-flow conduit device measured between the vanes. As shown in FIG. 4, the depth of a sub-flow conduit device is the distance 220 between the opposing walls of the flow conduit device 34 between which the vanes that define the sub-flow conduit device extend.

Referring now to FIG. 2, the flow conduit device 34 and the top end cap 4 of the filter element are formed as separate pieces. Further, the flow conduit device 34 is formed from two pieces.

Figure 18A:
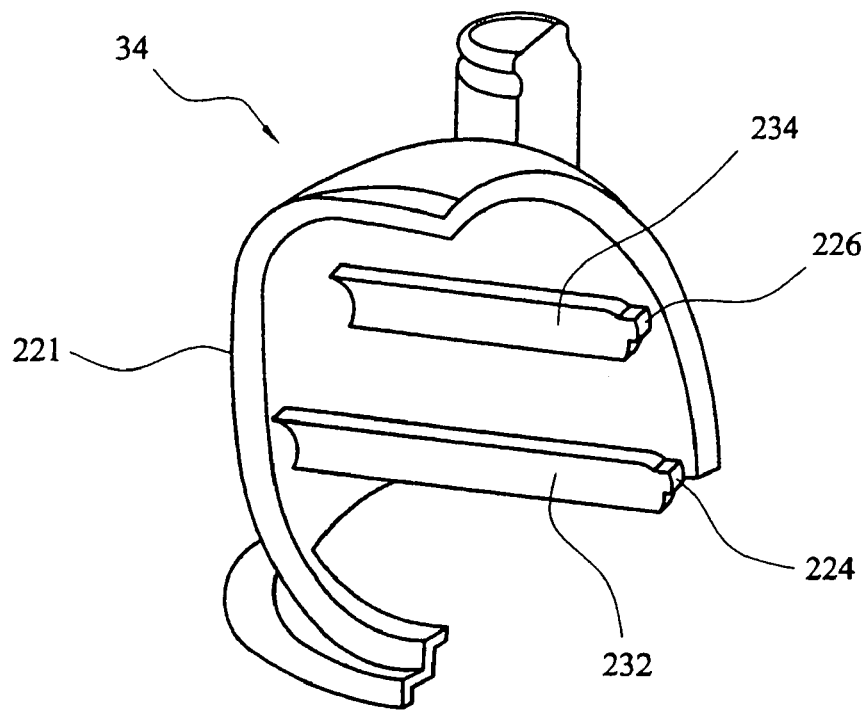
FIG. 18a is a schematic perspective view of the first piece of a two piece flow conduit device according to the invention.
Figure 18B:
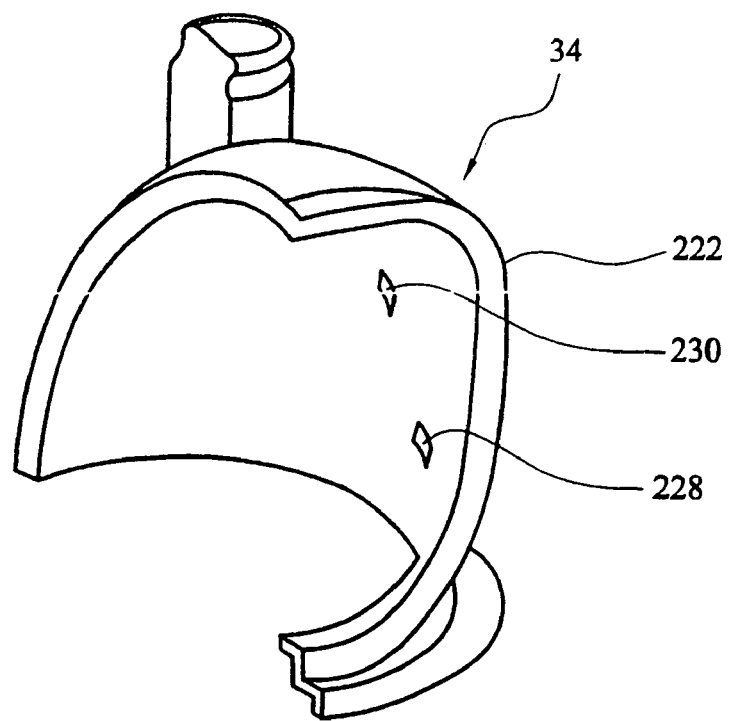

A two piece flow conduit device 34 is shown in FIGS. 18a and 18b. For sake of simplicity, the flow conduit device 34 of FIGS. 18a and 18b contains only a first vane 232 and a second vane 234. Otherwise, all other parts of the flow conduit device 34 of FIG. 15 are the same as that shown in FIG. 2 and share the same reference numerals. With reference to FIGS. 18a and 18b, the flow conduit device 34 comprises first 221 and second 222 matable pieces. The first 221 and second 222 pieces are mirror images of each other (the plane of symmetry of the pieces extending through both the axes of the first 162 and second 164 conduit openings) except that the first 232 and second 234 vanes extend from, and are part of, the first piece 221 of the flow conduit device 34. The first 232 and second 234 vanes have respective tangs 224, 226 at their free ends (i.e. the ends distal to the wall of the first piece 220 from which the vanes extend) that can be received within corresponding recesses 228, 230 formed in the wall of the second piece 222 of the flow conduit device 34. Therefore, when the first 221 and second 222 pieces are brought together to form the flow conduit device 34, the tangs 224, 226 are received within the corresponding recesses 228, 230 so that the first 232 and second 234 vanes are secured to the second piece 222 at their free ends.

Referring back to FIG. 2, the top end cap 4 further comprises an inlet tube 106, co-axial with the top end cap 4, which extends from the second conduit opening 164 of the flow conduit device 34 part way into the hollow space 8 to a downstream open end. In this embodiment, the inlet tube 106 and top end cap 4 are one piece. However, it will be appreciated that they need not be one piece. The inlet tube 106 defines a flow path 108 for gas which is to be filtered and is in fluid connection with the flow path 36 of the top end cap 4.

The top end cap 4 has annular opening 112 extending around the inlet tube 106 proximal to the flow conduit device 34. The inlet tube 106 is held within the annular 112 opening by fins 114 that extend between the top end cap 4 and the inlet tube 106.

Figure 3:
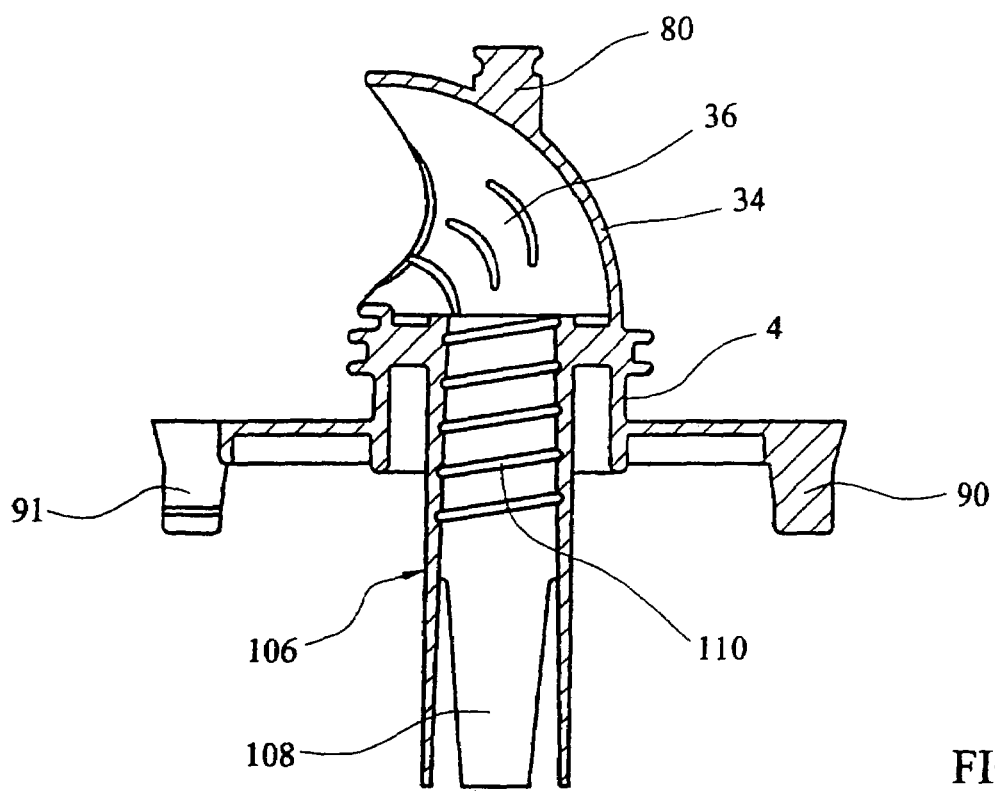
FIG. 3 is a sectional side elevation of the top end cap of the filter element shown in FIG. 2.

As best shown in FIG. 3, the inlet tube 106 has a rifling formation defined on its inner wall, extending from its end proximal to the top end cap 4, part way towards its end distal to the top end cap. The rifling formation is provided by a helically extending ridge 110 on the inner wall of the inlet tube 106.

Referring now to FIG. 4, a schematic perspective view of the top end cap 4 of FIG. 2 is shown. For simplicity and to enable illustration of the helically extending groove 110, the first vane 158 is not shown. As shown, the inlet tube 106 has first 116, second 118, third 119 and fourth (not shown) openings in its side wall. The openings are in the form of slits that taper uniformly from an open end at the downstream open end of the inlet tube 106, to a point towards the upstream open end of the inlet tube. Therefore, the proportion of the side wall of the inlet tube 106 that is open, increases towards the downstream open end of the inlet tube. The slits extend along 50% of the length of the inlet tube and in a direction parallel to the axis of the inlet tube. The slits are positioned equally around the inlet tube 106, i.e. they are spaced apart from each other by about 90° around the inlet tube.

FIGS. 6 to 10 show alternative embodiments of inlet tubes according to the invention that can be used with the top end cap 4 of FIG. 2. The top end caps 4 shown in FIGS. 6 to 10 are the same as that shown in FIG. 2. However, for simplicity, the first 158, second 159 and third 160 vanes, and also the helically extending ridge 110, are not shown.

Figure 6:
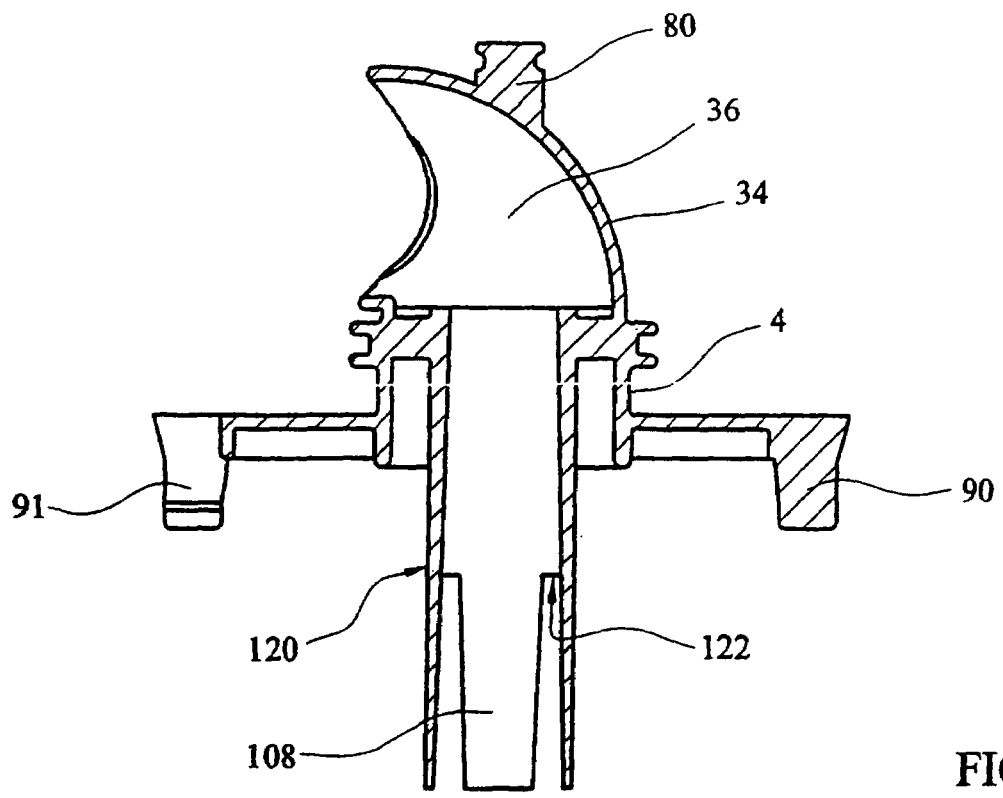
FIG. 6 is a schematic sectional elevation of the top end cap of the filter element shown in FIG. 2 illustrating a second embodiment of the inlet tube of the filter element.

FIG. 6 shows an inlet tube 120 according to the invention which is similar in configuration to that shown in FIG. 2, except that the first, second, third and fourth slits taper to a flat end 122, instead of to a point.

Figure 7:
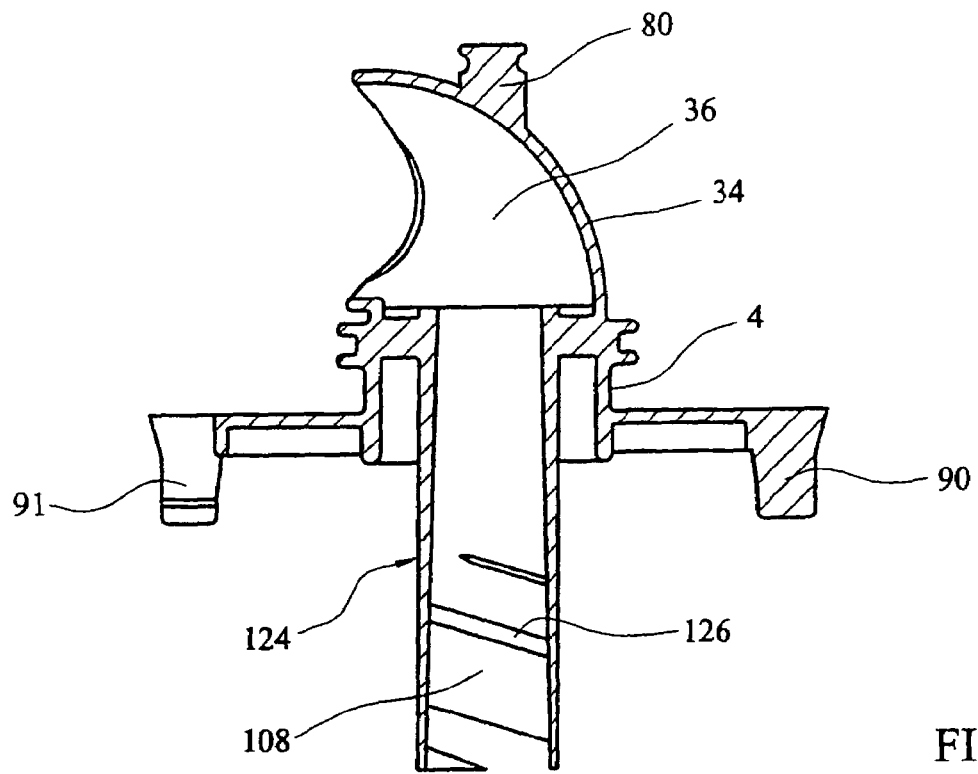
FIG. 7 is a schematic sectional elevation of the top end cap of the filter element shown in FIG. 2 illustrating a third embodiment of the inlet tube of the filter element.

FIG. 7 shows an inlet tube 124 which is similar in configuration to that shown in FIG. 2, except that the inlet tube 124 only has one opening 126, which is in the form of a helically extending slit. The helically extending slit extends from an open end at the downstream open end of the inlet tube 124, to a point towards the upstream open end of the inlet tube. As shown, the angle between the plane perpendicular to the axis of the inlet tube 124 and a straight line projecting substantially along a portion of the slit 126 is constant. However, the width of the helically extending slit 126, taken perpendicular to the straight line projecting substantially along a portion of the slit, decreases towards the upstream open end. Therefore, the proportion of the side wall of the inlet tube 124 that is open, increases towards the downstream open end of the inlet tube.

Figure 8:
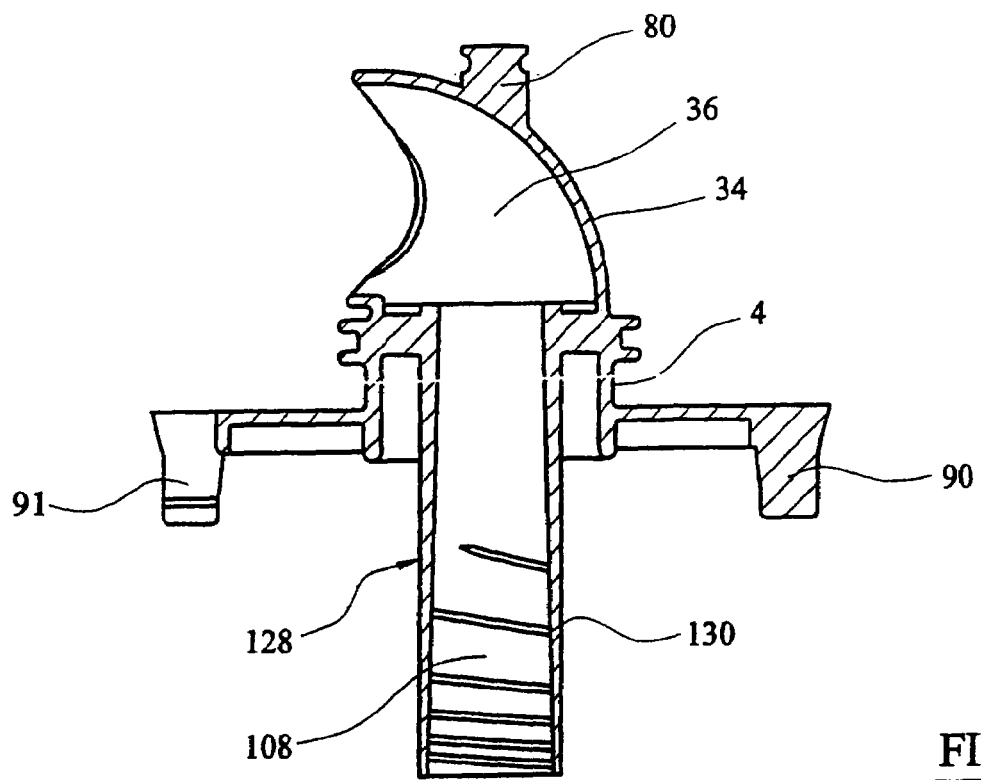
FIG. 8 is a schematic sectional elevation of the top end cap of the filter element shown in FIG. 2 illustrating a fourth embodiment of the inlet tube of the filter element.

FIG. 8 shows an inlet tube 128 which is similar in configuration to that shown in FIG. 7 in that the inlet tube 128 only has one opening 130 in the form of a helically extending slit. However, in contrast to the inlet tube 124 shown in FIG. 7, the width of the slit 130 shown in FIG. 8 in constant along its entire length. Further, the angle between the plane perpendicular to the axis of the inlet tube 128 and a straight line projecting substantially along a portion of the slit 130 decreases towards the downstream open end of the inlet tube. Therefore, the proportion of the side wall of the inlet tube 128 that is open, increases towards the downstream open end of the inlet tube.

Figure 9:
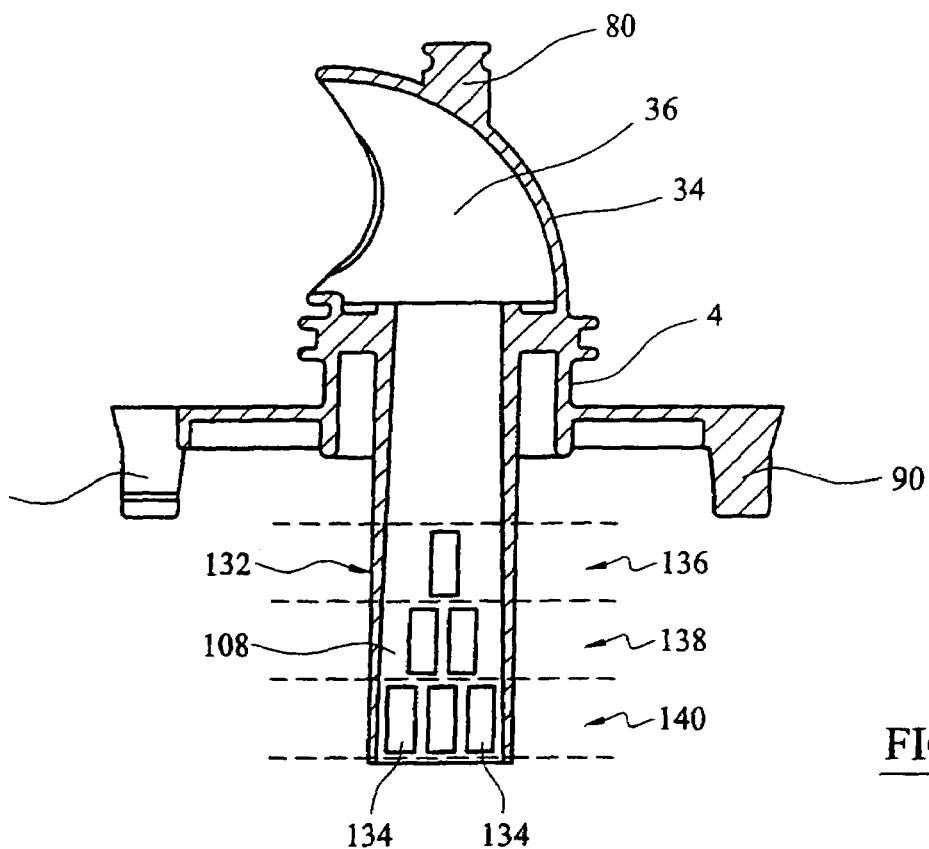
FIG. 9 is a schematic sectional elevation of the top end cap of the filter element shown in FIG. 2 illustrating a fifth embodiment of the inlet tube of the filter element.

FIG. 9 shows an inlet tube 132 which is similar in configuration to that shown in FIG. 2, except that the side wall has a plurality of openings 134 in the form of apertures. The apertures can be identified as wholly falling within three bands (an upstream band, designated generally by 136, a middlestream band 138, and a downstream band 140), extending around the inlet tube, each band defining a plane perpendicular to the axis of the inlet tube. The upstream band 136 is located within the downstream half of the inlet tube 132. Four apertures (only one of which can be seen in FIG. 9) are present in the upstream band 136, eight apertures (only two of which can be seen in FIG. 9) are present in the middlestream band 138, and twelve apertures (only three of which can be seen in FIG. 9) are present in the downstream band 140. The apertures have two equal length, straight, parallel sides, and has a convex end at each end of the aperture that extends between the parallel sides. The length of the parallel sides is longer than the transverse distance between them. All of the apertures 134 are equal in shape and dimension.

The four apertures in the upstream band 136 are positioned equally around the inlet tube 132, i.e. they are spaced apart from each other by about 90° around the inlet tube. The eight apertures in the middlestream band 138 are divided into four sets of two apertures. The four sets of two apertures are positioned equally around the inlet tube 132, i.e. they are spaced apart from each other by about 90° around the inlet tube. The twelve apertures in the downstream band 140 are divided into four sets of three apertures. The four sets of three apertures are positioned equally around the inlet tube 132, i.e. they are spaced apart from each other by about 90° around the inlet tube. Therefore, the proportion of the side wall of the inlet tube 132 that is open increases towards the downstream open end of the inlet tube.

Figure 10:
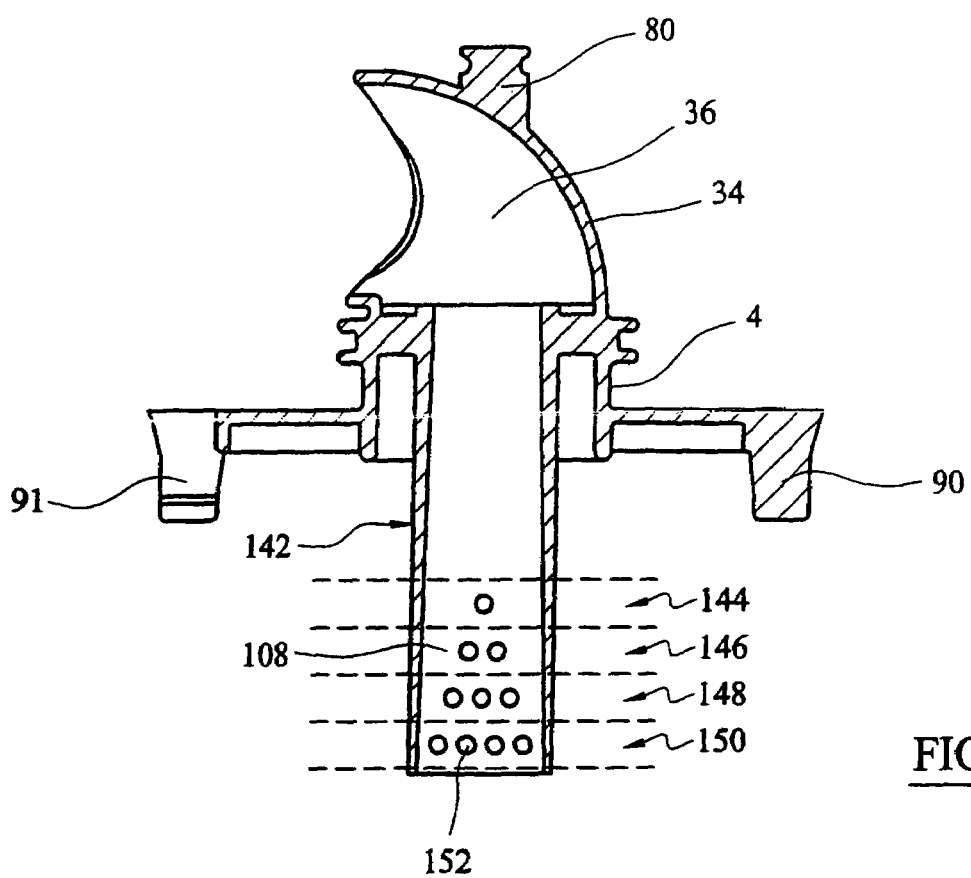
FIG. 10 is a schematic sectional elevation of the top end cap of the filter element shown in FIG. 2 illustrating a sixth embodiment of the inlet tube of the filter element.

FIG. 10 shows an inlet tube 142 which is similar in configuration to that shown in FIG. 9, except that the apertures 152 are circular in shape, and that four bands (an upstream band, designated generally by 144, an upstream middlestream band 146, a downstream middlestream band 148, and a downstream band 150) can be identified instead of three. Four apertures (only one of which can be seen in FIG. 10) are present in the upstream band 144, eight apertures (only two of which can be seen in FIG. 10) are present in the upstream middlestream band 146, twelve apertures (only three of which can be seen in FIG. 10) are present in the downstream middlestream band 148, and sixteen apertures (only four of which can be seen in FIG. 10) are present in the downstream band 150.

Referring back to FIG. 2, each of the end caps has a trough 14 formed in it. The top part of the filtration layer 10 and the drainage layer 12 are retained and sealed in the trough 14 of the top end cap 4, and the bottom part of the filtration layer is retained and sealed in the trough 14 of the bottom end cap 6.

The bottom end cap 6 further comprises a flange part 16, spaced apart from the surface 20 of the second end cap facing away from the top end cap 4. The flange part 16 extends generally transverse to the axis of the filter element. The flange part 16 is located centrally with respect to the bottom end cap 6, and is spaced from it by a co-axial stem 28 extending between them. The flange part 16 and second end cap 6 between them define an annular slot 22, in which the drainage layer can be received. The slot is tapered inwardly so that the distance between the flange and the surface of the end cap decreases progressively. The slot is therefore generally V-shaped when the end cap is viewed from one side.

The bottom part of the drainage layer 12 is wrapped over the wall 18 of the trough 14 of the bottom end cap 6 and folded under its bottom surface 20, in the annular slot 22 between the second end cap 6 and the flange part 16. The drainage layer 12 is fastened in the space 22 by means of a loop of elastic material 98, such as an elastic band or O-ring, which can be stretched to fit over the flange. The loop 98 is sized so that it is pinched between the opposing surfaces of the slot and the drainage layer: the transverse dimension of the material of the loop is slightly greater than the distance between the drainage layer and the opposing surface of the slot when the loop the tension in the loop (resulting from stretching it to fit it over the flange) is relaxed. This causes the loop and the drainage layer to be compressed slightly, so that the drainage layer is gripped in the annular slot. The diameter of the flange is smaller than the diameter of the end cap so that at least a part 30 of the drainage layer 12 folded over the bottom surface 20 is exposed.

The bottom end cap 6 also has a central upstand portion 100. The central upstand portion 100 extends from the bottom of the hollow space defined by the bottom end cap 6 towards the first end cap. The central upstand portion 100 has a generally cylindrical base 102, and a generally conical part 104 extending from the base toward the first end cap 4. The diameter of the cylindrical base 102 is the same as that of the stem 28.

Referring now to FIG. 1, an assembly according to the present invention is shown which includes a housing 50 in which the filter element shown in FIG. 2 can be located when in use. However, as shown, an alternative embodiment of a filter element which is substantially the same as that shown in FIG. 2, is located within the housing.

The filter element shown in FIG. 1 is substantially the same as that shown in FIG. 2, except that an extension 236 is provided on the external wall of the flow conduit device 34 and extends away from the second conduit opening 164, instead of the port 80 for connection to a gauge. The extension 236 has seating portion 238 having a generally circular cross-section, and a fin 240 having a generally planar configuration which extends between the seating portion 238 and the flow conduit device 34. The seating portion 238 provides a generally flat surface 244 and a wall 256 which extends around the periphery of the surface and away from the second conduit opening 164. A differential pressure measuring device (discussed in more details below) can be received by and contained within the area defined by the surface 244 and wall 256 of the seating portion. The extension 236 is configured so that the axis of the circular seating portion 238 is angled relative to the axis of the second conduit opening 164 by 5°. Therefore, as shown in FIG. 1, when viewed in cross-section, the seating portion 238 appears slanted relative to the filter element. A groove 242 that is capable of receiving an O-ring is formed around the periphery of the wall 256. A vent 246 that extends between the flow path 36 of the flow conduit device 34 and the surface 244 of the seating portion 238 is formed within the extension 236.

The housing comprises a head 52 and a body 54 which can be connected to one another by means of cooperating screw threads (as is well established) at their interfaces 86, 88. The head and body are formed from a metallic material, especially aluminum or an alloy thereof. They can be formed by machining, or by techniques such as casting.

The housing body comprises a cylindrical wall 55, an end wall 57 at one end of the internal wall, and an open end at the opposite end of the cylindrical wall. The housing body defines a space within which the filter element is coaxially located when in use. Liquid drops which drain from the drainage layer are collected in a reservoir 60 in the housing body. The housing includes a drain outlet 62, for example of the kind which is disclosed in European Patent No. EP-A-81826.

Figure 5:
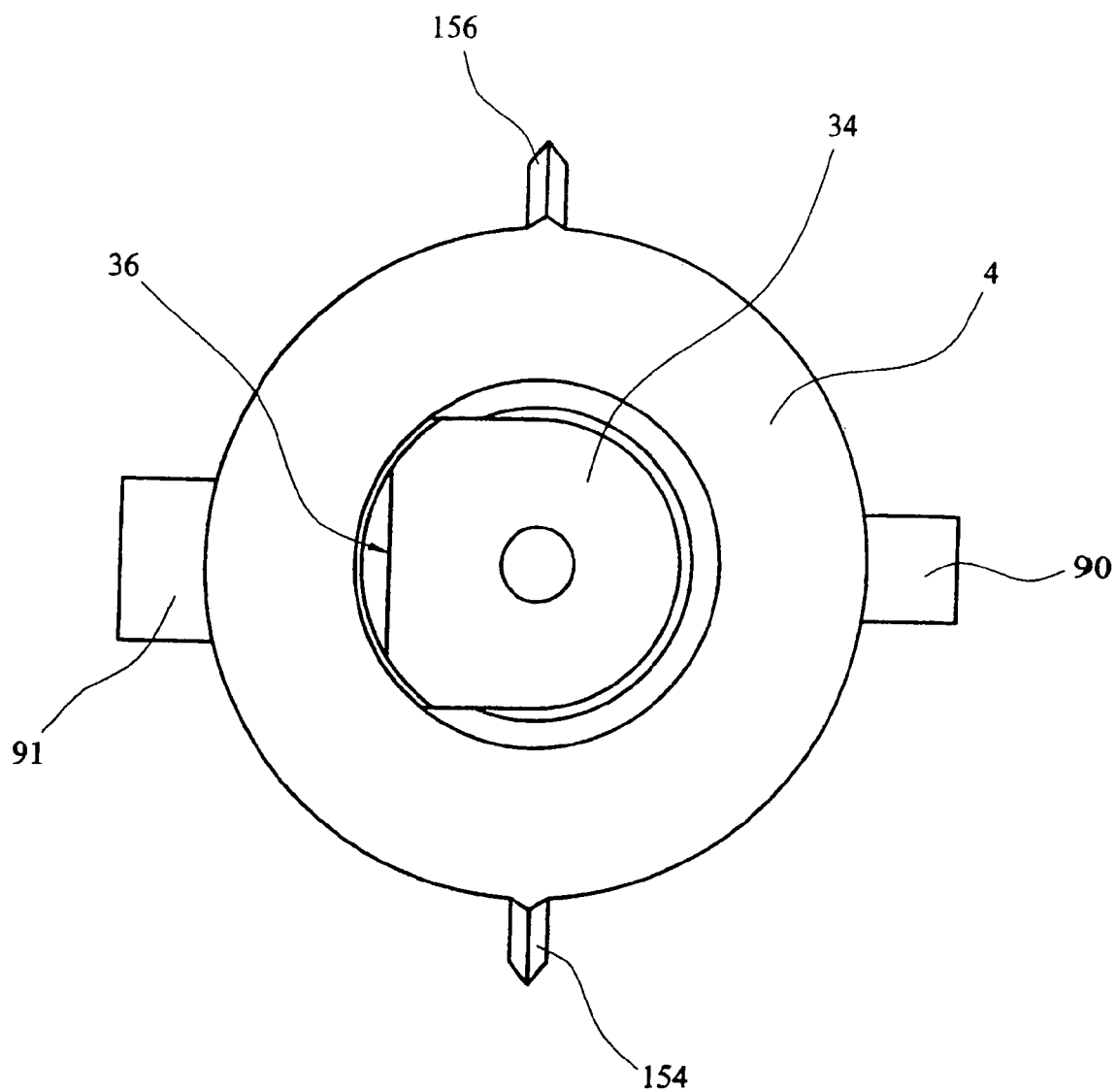
FIG. 5 is a schematic top view of the top end cap of the filter element shown in FIG. 2.

The filter element fits on to the housing body by means of inter-engaging formations in the form of ribs and grooves. The top end cap 4 has first 90, second 91, third 154 and fourth 156 ribs (for example as shown in FIGS. 4 and 5) around its perimeter that extend from the top end cap towards the bottom end cap, on the exterior of the filter element. The four ribs are spaced apart about 90° around the top end cap. Further, the first 90 and second 91 ribs are spaced about 180° around the top end cap. The first 90 and second 91 ribs are received in the housing body by means of correspondingly shaped and positioned first 92, second 93, grooves provided in the interior of the housing body at the open end.

The third and fourth ribs 154, 156 are identical in shape size and configuration. The leading edge of the third and fourth ribs 154, 156 (which is directed into the gas stream) is rounded and the trailing edge of the rib is tapered inwardly, towards (optionally to) a sharp edge or point. These ribs 154, 156 are approximately aerofoil-shaped when viewed in cross-section (perpendicular to the axis of the assembly). This shape gives minimal resistance to the flow of gas past the ribs. In contrast to the first 90 and second 91 ribs, there are no corresponding grooves for the third 154 and fourth 156 ribs. Instead, the axial faces of the third 154 and fourth 156 ribs match the profile of the housing body so that they rest against the body when the filter element has been fitted within the housing body.

The first and second ribs 91, 90 are shaped differently to that of third and fourth ribs 154, 156. The leading edge of the first and second ribs 90, 91 are rounded, and the trailing end is flared outward from the rounded leading edge. The first and second ribs 90, 91 have an approximately tapered "V" shape when viewed in cross-section (perpendicular to the axis of the assembly) with a flat top surface extending between the ends of the "V".

As can be seen in FIG. 1, the second rib 91 is located under the internal cylindrical wall 72 of the head 52 of the housing 50 (discussed in more detail below). Therefore, when the filter assembly is in use, the tapered sides of the second rib 91 aids the flow gas around the internal cylindrical wall 72, and towards the outlet port 58. The first rib 90 is located below the output port 58. Therefore, in order to minimize the direction of gas away from the output port, the width of the first rib 90 at its widest point is smaller than that of the second rib 91. Further, due to the first rib 90 and its corresponding first groove 92 being narrower than the second rib 91 and its corresponding second groove 93, the filter element can only be inserted into the body in one orientation. This can ensure that when the housing is assembled, the inlet port 56 of the housing head 52 (described in more detail below) is aligned with the flow conduit device 34 of the top end cap 4, rather than incorrectly aligned with the outlet port 58 of the housing head. This is especially true when the housing head and body are configured so that they can only fit together in one orientation. This can be achieved by providing a single start screw thread at the interfaces 86, 88 of the housing head and body.

The filter element is assembled in the housing body by locating the first and second ribs 90, 91 with the first and second grooves 92, 93 of the housing body 54, and then sliding the ribs into the grooves until they sit on the bottom of the grooves. Once the ribs have been fully received by the grooves, the filter element is securely suspended within the housing body. Therefore, as will be appreciated, the axial position of the filter element within the housing body can be controlled by the shape and size of the ribs and grooves. Further, rotation of the filter element relative to the housing body is inhibited by the interlocking of the ribs with the grooves.

Once the filter element is appropriately assembled in the housing body, an annular space 64 is defined between the filter element and the housing. The filter element can be removed from the housing body 54, by pulling the filter element away from the housing body along its axis.

The housing body 54 has two a plurality of fins 96 extending along the cylindrical wall 55, parallel to the axis of the housing body. The number of fins 96 provided on the cylindrical wall 55 of the housing body 54 can depend on the size of the housing body. For example, in general, the larger the housing body, the greater the number of fins 96 provided. Typically, the minimum number of fins 96 provided will be two. In the embodiment shown, the housing body has six fins 96, however, only two are shown. The fins extend from the end wall 57 of the housing body towards the open end, and are spaced uniformly around the cylindrical wall 55 of the housing body 54. When the filter element is assembled in the housing body so that the ribs have been fully received within the grooves, the part of the drainage layer 12 which extends over the bottom end cap 6 is compressed between the bottom end cap and the edge of the fins 96. Accordingly, the transverse position of the filter element within the housing body can be controlled by the shape and size of the fins. The cross-section of the edge of the fins which contacts the drainage layer, taken perpendicular to the length of the ridge, is a rounded convex shape. As a result of the local compression of the drainage layer between the fins and the second end cap, liquid collected in the drainage layer is encouraged to drain from it, along each fin.

The housing head includes an inlet port 56 which communicates with the flow conduit device 34 on the top end cap 4 through a transversely extending primary chamber 68 within the housing head. The primary chamber 68 is defined by an internal cylindrical wall 72 extending transversely within the housing head, and an internal end wall 70 opposite the inlet port 56. The internal cylindrical side wall 72 and end wall 70 are integral to the housing head. A first circular aperture 74, coaxial with the housing head, is defined within the part of side wall of the inlet conduit that is proximal to the filter element when assembled. A recess 248, that extends away from the filter element when the assembly is assembled, and that is coaxial with the housing head, is formed within the primary chamber 68. Further, a vent 250 that extends between the primary chamber 68 and the area surrounding it is formed in the end wall 70.

The housing head 52 is secured to the body 54 (once the filter element has been located in the housing body) by locating the flow conduit device 34 of the top end cap 4 in the primary chamber 68 of the housing head through the circular aperture 74. The flow conduit device 34 has an O-ring 66 on its external surface which is received by the aperture 74, in which it is compressed to form a fluid tight seal. The seating portion 238 also has an O-ring 252 which is compressed between the groove 242 of the seating portion and the side wall of the recess 248 within primary chamber 68, to form a fluid tight seal, thereby defining an auxiliary chamber 254 within the primary chamber.

The housing head 52 and body 54 are secured by rotating one relative to the other so that their cooperating screw threads at their interfaces 86, 88, are tightened to interlock with each other. Once the head is properly secured to the body 54 the vent 250 in the end wall 70 of the housing head 52 extends between the auxiliary chamber 254 and the area within the housing head surrounding the primary chamber 68.

A device 258 for measuring differential pressure is contained within the area defined by the surface 244 and the wall 256 of the seating portion 238. Suitable differential pressure measuring devices are known in existing products, for example in products sold by Domnick Hunter Limited under the trade mark OIL-X. The device 258 can be secured to the seating portion 238 by frictional forces between it and the wall 256 of the seating portion 238; i.e. the device is a secured to the seating portion 238 by a "press-fit" connection. However, other techniques can be used to secure the pressure measuring device, for example a threaded engagement or an adhesive. An O-ring 260 is provided on the pressure measuring device 258 which is compressed between the device and the wall 256 to provide a fluid tight seal between the vent 246 within the extension 236 and the auxiliary chamber 254. As the vent 246 within the extension 236 is in fluid communication with gas upstream of the filter element and the auxiliary chamber 254 is in fluid communication with gas downstream of the filter element via the vent 250 in the end wall 70, the pressure measuring device is capable of measuring the pressure drop across the filter element.

The filter assembly can be disassembled by rotating the housing body 54 relative to the head 52 so that their cooperating screw threads are loosened. Any rotational force that is imparted on the top end cap 4 of the filter element by frictional forces between the O-rings 66, 252 of the end cap 4 and the housing head is negated by the opposite rotational drive that is provided by the first and second ribs 90, 91 acting against the first and second grooves 92, 93 in the housing body in which the ribs are received. Therefore, as the housing body 54 is rotated relative to the housing head 52, the filter element will tend to reside in the housing rather than be drawn away from the body with the head, and hence when the housing head 52 is removed from the housing body 54, the filter element will remain located within the body, rather than being removed from the body with the head.

The housing head includes an outlet port 58 through which gas which has passed through the wall 2 of the filter element can be supplied to a downstream application. The outlet port communicates with the annular space 64 between the wall of the filter element and the internal wall of the housing.

In use, a gas that is to be filtered enters the filter assembly through the inlet port 56 in the housing head and is directed to the hollow space 8 in the filter element by means of the primary chamber 68 in the housing head and the flow paths, 36 and 109 in the flow conduit device of the filter element, and the inlet tube, respectively. A helical flow is imparted in the gas stream entering the hollow space 8 by the helically extending ridge 110, as the gas stream passes through the inlet tube. The supply of gas entering the hollow space 8 is graded due to the gradual increase in the proportion of the inlet tube that is open towards its downstream end.

From the hollow space 8, the gas flows generally radially outwardly through the filter medium of the wall 2. Any liquid in the gas stream will be coalesced by the filtration layer 10 and any coalesced liquid will be carried to the drainage layer 12 by the flow of gas, where the liquid will be retained. The liquid will tend to drain to the bottom of the drainage layer 12, where it can tend to accumulate in the part of the drainage layer 12 folded under the bottom surface 12, thereby forming a wet band. When that part of the drainage layer 12 becomes sufficiently saturated, the liquid will begin to drain from any exposed parts of that part of the drainage layer, generally in the form of drops. The compression of the drainage layer 12 by the fins 96 will tend to encourage the drainage of liquid from the drainage layer along the fins.

Filtered gas exiting the filter element enters the annular space 64 between the filter element and the housing. Filtered gas is then discharged from the filter assembly through the outlet port 58 in the housing head 52, which is in fluid communication with the annular space 64. Gas flowing from the annular space 64 to the outlet port 58 is directed around the internal cylindrical wall 72 of the housing head 52, and toward the outlet port, by the tapered rib 91 that is located directly underneath the cylindrical side wall.

Figure 19:
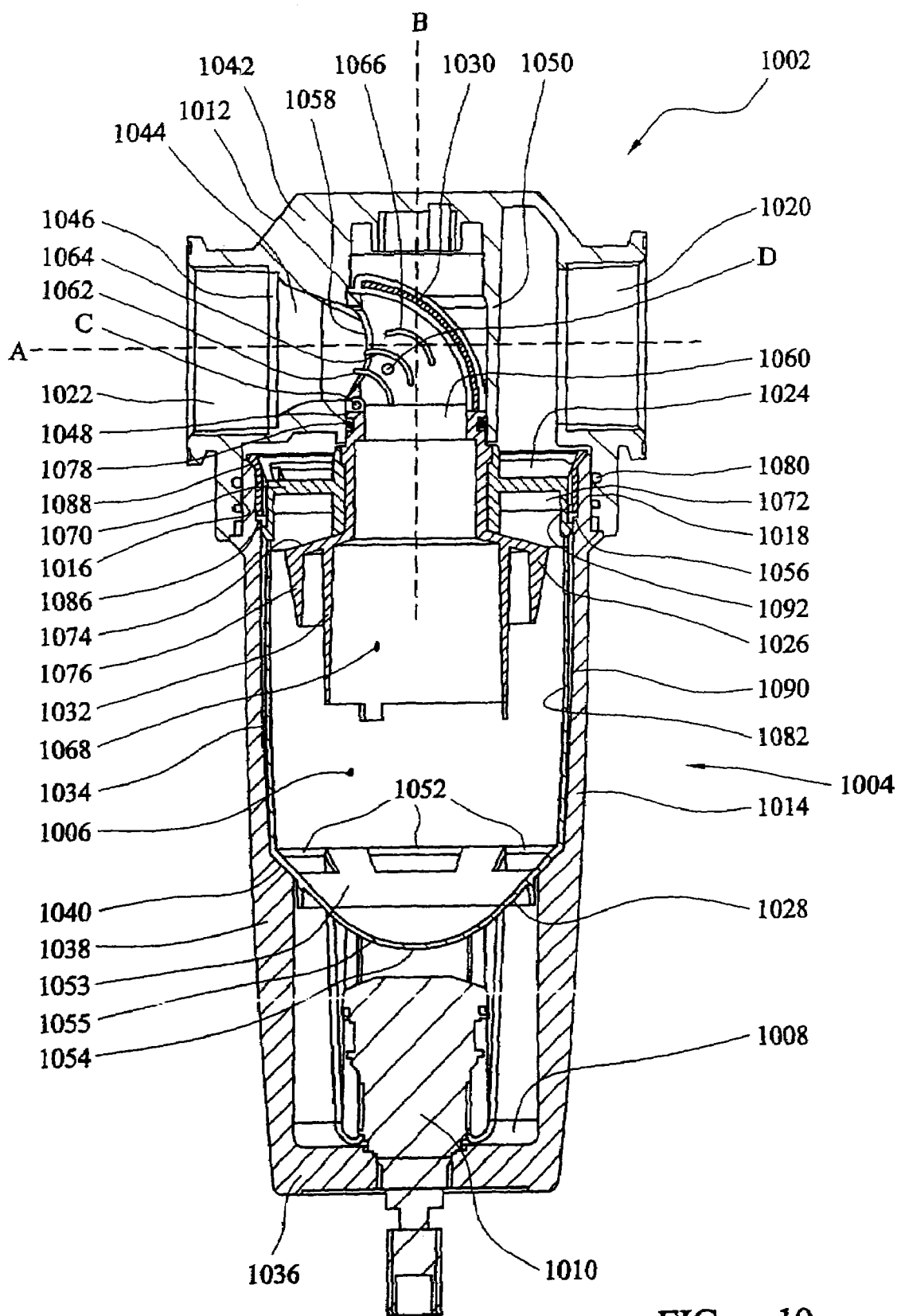
FIG. 19 is a sectional side elevation through an alternative embodiment of an apparatus for removing material entrained in a gas stream according to the present invention which utilizes centrifugal forces to separate the material from the gas stream.

FIGS. 19 to 24 show an alternative embodiment of the invention which utilizes centrifugal forces to remove material entrained in a gas stream. In particular, FIG. 19 shows a separator assembly 1002, which comprises a housing 1004 defining an inner volume 1006. The housing 1004 comprises a head part 1012, and a body part 1014 which can be connected to one another by means of cooperating screw threads at their interfaces 1016, 1018. The housing 1004 further comprises inlet 1020 and outlet 1022 ports located in the head part 1012, for gas to enter and exit the separator assembly 1002, a reservoir 1008 located at a second end of the housing opposite the first end, and a liquid drainage port 1010. The separator assembly further comprises a flow director 1024, a flow deflector 1026, a shield 1028, a flow conduit device 1030 which includes a conduit portion 1032, all located within the body part 1014 of the housing 1004.

The head part 1012 and body part 1014 are formed from a metallic material, especially aluminum or an alloy thereof. They can be formed by machining or by techniques such as casting.

The body part 1014 comprises a cylindrical wall 1034, an end wall 1036 at one end of the cylindrical wall 1034, and an open end at the opposite end of the cylindrical wall. Liquid separated from a gas stream flowing through the separator assembly is collected in the reservoir 1008. The liquid drainage port 1010 allows liquid collected in the reservoir 1008 to drain from the housing 1004. An example of a suitable liquid drainage port 1010 is disclosed in European Patent No. EP-A-0081826.

A plurality of fins 1038 are provided in the body part 1014 towards its second end. The fins 1038 extend part way along the cylindrical wall 1034 from the second end of the housing toward the first end of the housing, parallel to the axis of the body part. Each fin 1038 provides a ledge 1040, toward its end proximal the head end of the housing, on which the shield 1028 can sit, as described in more detail below.

The head part 1012 contains a primary chamber 1044 within it having a first end 1046 communicating with the outlet port 1022 and a second end 1048 having an opening communicating with the inner volume 1006 of the housing 1004 when the separator assembly 1002 is assembled. The primary chamber 1044 is defined by an internal cylindrical wall 1042 extending transversely through within the head part and an internal end wall 1050 opposite the outlet port 1022.

The shield 1028 has a bowl-shaped face 1053 and a dome-shaped face 1055. The perimeter of the shield 1028 is circular in shape. The shield has a plurality of windows 1052 cut out of it towards its circumference. The windows 1052 allow liquid to pass the shield 1028 from the space in the inner volume 1006 above the shield to the reservoir 1008, as described in more detail below.

Figure 21:
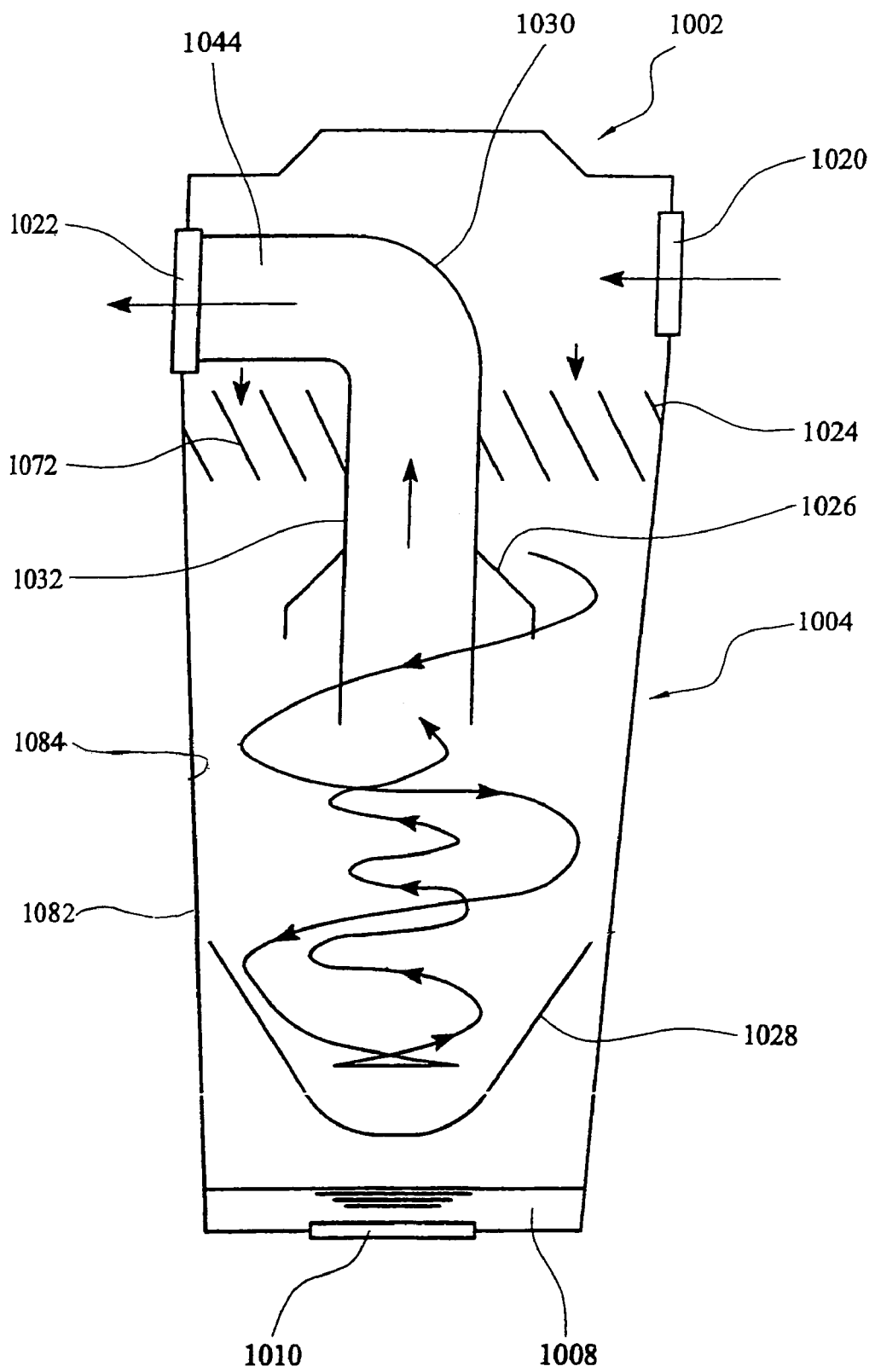
FIG. 21 is a schematic sectional side elevation through the assembly shown in FIG. 19, illustrating the flow of gas through the assembly.

The diameter of the shield 1028 decreases away from its perimeter towards its centre point 1054. The diameter of the shield 1028 decreases monotonically for part way towards its centre point, and then progressively decreases for the rest of the way towards its centre point. Therefore, when taken in cross-section as shown in FIGS. 19, 21 and 22, the faces of the shield define a rounded V-shape, having straight edges 1096 towards its ends 1098 and a rounded bottom towards its centre point 1054.

Figure 22:
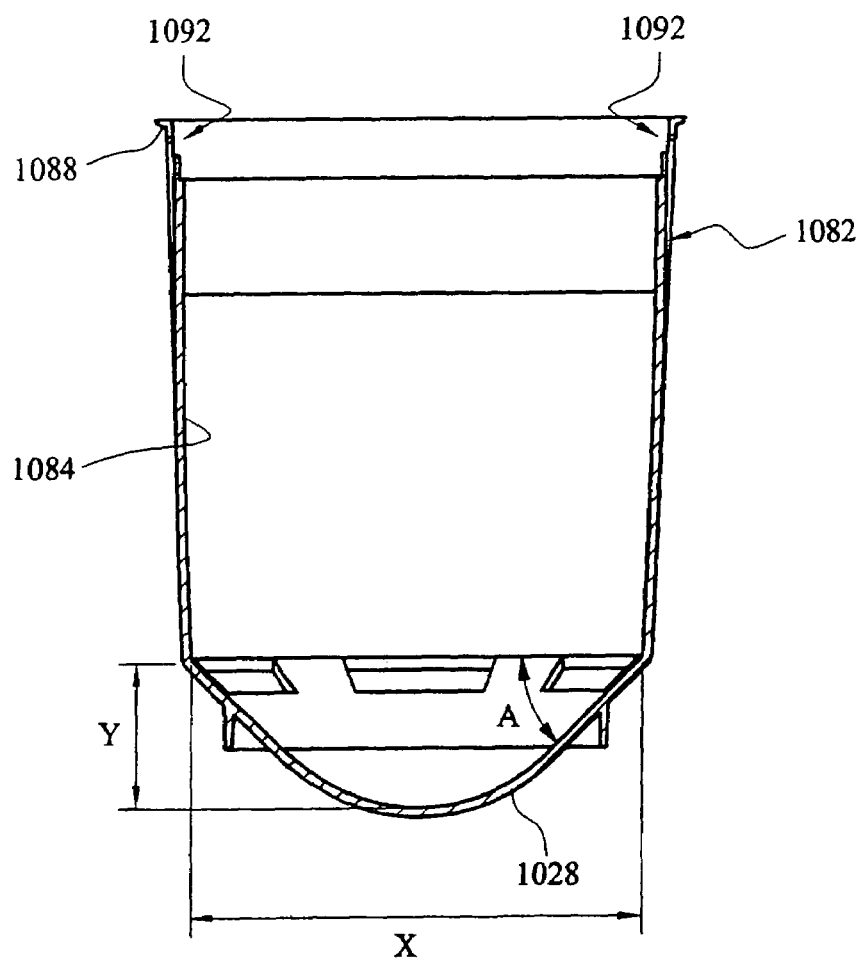
FIG. 22 is a sectional side elevation through the shield of the separator assembly shown in FIG. 19.
Figure 23:
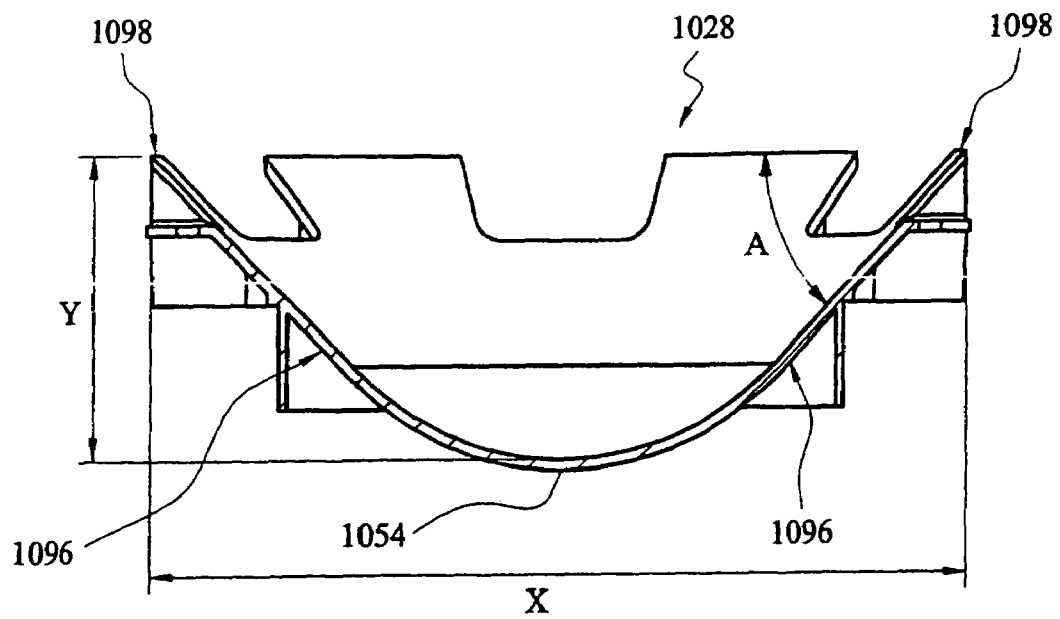
FIG. 23 is a sectional side elevation through the shield and the shield wall of the separator assembly shown in FIG. 19.

As best shown in FIG. 22, the angle A between the straight edges 1096 of the shield and the plane in which the perimeter of the shield lies, is approximately 45°. Further, the ratio of the diameter X of the shield 1028 to the depth Y of the shield 1028 is approximately 2.8.

The shield 1028 is formed from a polymeric material, such as nylon. It can be formed by techniques such as injection moulding.

A shield wall 1082 is provided that extends around the circumference of the shield 1028. The shield wall 1082 extends from the shield 1028 to an open end proximal the open end of the housing body part 1014. The shield wall 1082 is generally cylindrical in shape, and is a snug fit within the housing body part 1014. The surface of the inner side 1084 of the shield wall 1082 is rough in texture. The open end of the shield wall 1082 comprises an annularly extending lip 1088. When assembled, the 1088 lip rests on the open end of the housing body part 1014 as described in more detail below.

Figure 20:
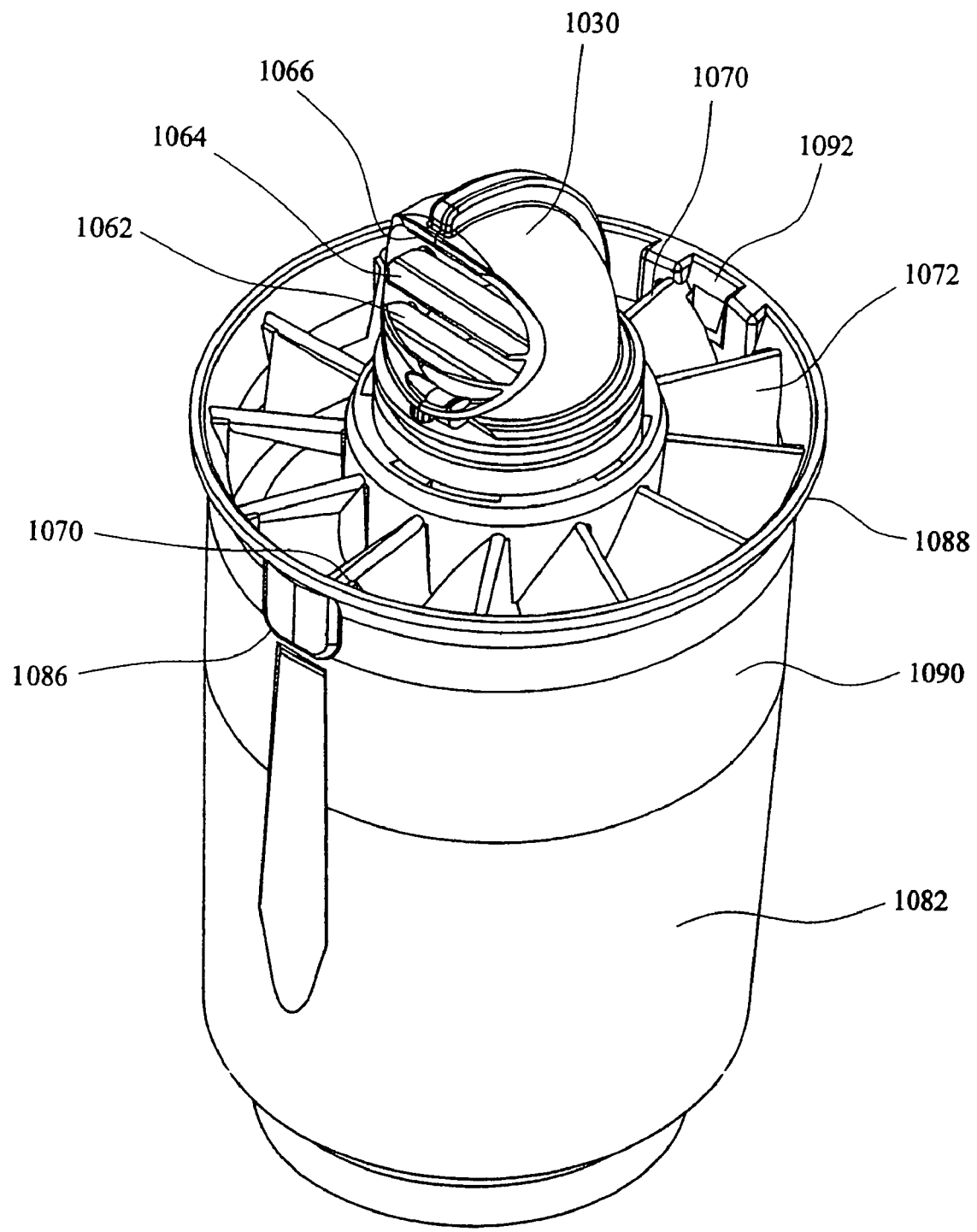
FIG. 20 is a perspective view of the assembly shown in FIG. 19, without the head part of the housing.
Figure 24:
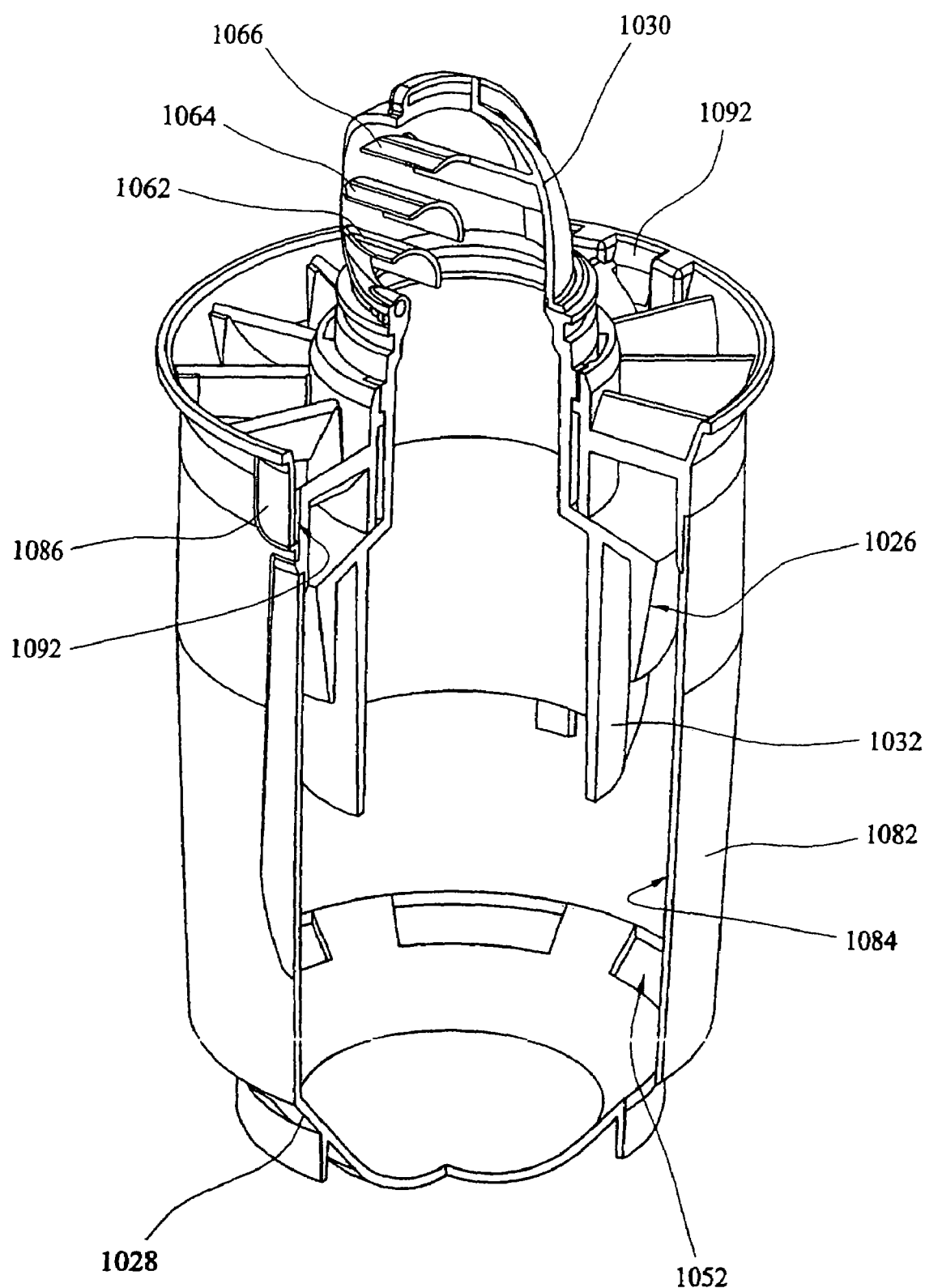
FIG. 24 is a cut-away perspective view of the separator assembly shown in FIG. 19, without the housing.

A plurality of grooves 1092 are provided around the inner side 1084 of the shield wall 1082 at its open end for receiving ribs 1070 of the flow conduit device 1030 as described in more detail below. In the embodiment shown, two grooves 1092 are spaced 180° around the open end of the shield wall 1082. As best shown in FIGS. 20 and 24, there are also provided ribs 1086 spaced around the outer side 1090 of the open end of the shield wall 1082. In the embodiment shown, the grooves 1092 also act as the ribs 1086, and therefore there are provided two ribs 1086 that are spaced 180° around the open end of the shield wall 1082. When assembled, the ribs 1086 are slidingly received within corresponding grooves 1056 in the cylindrical wall 1034 of the housing body part 1014.

The flow conduit device 1030 has a first opening 1058 that is directed towards the outlet port 1022 and has a first axis A, and a second opening 1060 that is directed toward the body part 1014 of the housing and has a second axis B. The angle between the axes A, B of the first 1058 and second 1060 openings is 90°. The flow conduit device 1030 provides a continuous flow path between the two openings, and therefore provides a smooth change of direction for gas flowing through it when in use. The flow conduit device 1030 turns about an axis C which extends perpendicularly to the axes A, B of the first 1058 and second 1060 openings. (As shown in FIG. 19, the axis C extends perpendicularly to the plane along which the cross-section of the separator assembly 1002 is taken).

An O-ring 1078 is provided around the flow conduit device 1030, within an annular recess that extends around the external surface of the flow conduit device at its second opening 1062 end.

The flow conduit device 1034 contains first 1062, second 1064 and third 1066 curved vanes extending perpendicularly across the flow conduit device 34. Each vane 1062, 1064, 1066 curves around its own axis and the radius of curvature is the same for each vane. Further, the length of the vanes 1062, 1064, 1066, measured between their leading and trailing edges, is the same for each vane. The axes around which the vanes 1062, 1064, 1066 curve extend parallel to the axis C around which the flow conduit device 1030 curves. For example, the second vane 64 curves around an axis D. The vanes 1062, 1064, 1066 each have concave and convex surfaces, wherein the concave surface of each vane faces the first 1058 and second 1060 openings of the flow conduit device 1030. Accordingly, the vanes 1062, 1064, 1066 help guide the flow of gas between the first 1058 and second 1060 openings.

The flow conduit device 1030 further includes a conduit portion 1032 which, when the separator assembly 1002 is assembled, extends into the housing body part 1014. In this embodiment, the flow conduit device 1030 and the conduit portion 1032 are one piece. However, it will be appreciated that they need not be one piece. The conduit portion 1032 defines a flow path 1068 for gas leaving the inner volume 1006 and is in fluid communication with the second opening 1060 of the flow conduit device 1030. The walls of the conduit portion 1032 are cylindrical. The diameter of the conduit portion 1032 is narrower towards its end proximal the second opening 1060.

The flow director 1024 comprises plurality of baffles 1072 provided around the conduit portion 1032. When the flow conduit device 1030 is located within the housing body part 1014, the baffles 1072 extend between the conduit portion 1032 and the inner side of the cylindrical wall 1034 of the body part. The baffles are rectangular in shape and are arranged so that their planar faces extend at an angle to the longitudinal axis of the housing body part 1014 when the flow conduit device 1030 is located in the body part 1014.

The flow conduit device 1030 further comprises a plurality of ribs 1070 that extend away from the conduit portion 1032 at its end proximal the second opening 1060. The ribs 1070 can slide into the grooves 1092 in the shield wall 1028 in order to hold the flow conduit device 1030 within body part 1014. In the embodiment shown two ribs 1070 are provided spaced 180° around the conduit portion 1032. Also in the embodiment shown, each of the ribs 1070 is also a baffle 1072. However, it will be appreciated that the ribs 1070 can have a different configuration to the baffles 1072 and therefore not be baffles.

The flow deflector 1026 extends annularly around the conduit portion 1032, and is shaped and sized so that it extends away from the conduit portion part way toward the inner side of the shield wall 1082, when the flow conduit device 1030 is located in the body part. The flow deflector 1026 is located on the side of the baffles 1072 distal to the second end 1062 of the flow conduit device 1030. The flow deflector 1026 comprises a ledge portion 1074 proximal the baffles 1072 which extends away from the conduit portion 1032, substantially perpendicularly to the axis of the conduit portion 1032, and an side skirt 1076 which extends away from the end of the ledge portion, substantially parallel to the axis of the conduit portion.

The flow conduit device 1030 is formed from a polymeric material, for example nylon. The flow conduit device 1030 can be formed by techniques such as injection moulding. The different parts of the flow conduit device 1030, such as the conduit portion 1032, the ribs 1070, the flow director 1024 and the flow deflector 1026 can be formed together as one piece, as different pieces, or as a combination of single and different pieces (i.e. the conduit portion 1032 and the flow deflector 1026 can be formed as one piece and the flow director 1024 as a separate piece subsequently fastened to the conduit portion).

The separator assembly 1002 is assembled by locating the shield 1028 and shield wall 1082 in the housing body part 1014 by sliding them through the body part until the portions between the windows 1052 of the dome-shaped face 1055 of the shield 1028 rest on the ledges 1040 of the fins 1038, and until the ribs 1086 are received within the grooves 1056 in the cylindrical side wall 1034 of the housing body part 1014.

Once the ribs 1086 have been fully received by the grooves 1056, the shield 1028 and shield wall 1082 are securely suspended within the housing body part 1014, and the lip 1088 should rest on the open end of the housing body part 1014. The shield 1028 and shield wall 1082 are then securely suspended within the housing body part 1014, and rotation of the shield 1028 and shield wall 1082 within the housing body part 1014 is restricted by the interlocking of the ribs 1086 with the grooves 1056.

The flow conduit device 1030 is then located in the housing body part 1014 by sliding the ribs 1070 into the grooves 1092 until they sit on the bottom of the grooves. Once the ribs 1070 have been fully received by the grooves 1092, the flow conduit device 1030 is securely suspended within the housing body part 1014. Therefore, the axial position of the flow conduit device 1030 within the housing body part 1014 can be controlled by the shape and size of the ribs 1070 and the grooves 1092. Further, rotation of the flow conduit device 1030 is prevented by the interlocking of the ribs 1070 with the grooves 1092. The flow conduit device 1030 can be removed from the housing body part 1014 by pulling the flow conduit device away from the body part along its axis.

The housing head part 1012 is secured to the housing body part 1014 by locating the flow conduit device 1030 in the primary chamber 1044 of the head part through the opening at the primary chamber's second end 1048. The O-ring 1078 is received by the opening, and is compressed by the walls of the primary chamber 1044 to form a fluid tight seal.

The housing head part 1012 and body part 1014 are secured by rotating one relative to the other so that their cooperating screw threads at their interfaces 1016, 1018 are tightened to interlock with each other. An O-ring 1080 is provided at the interfaces 1016, 1018 which is compressed by the interfaces to form a fluid tight seal. When assembled, the inlet port 1020 is in fluid communication with an inner volume 1006 of the housing 1004.

The separator assembly 1002 can be disassembled by rotating the housing head part 1012 and body part 1014 relative to each other so that their cooperating screw threads are loosened. Any rotational force that is imparted on the flow conduit device 1030 by frictional and related forces (for example arising from physical or chemical interactions or both) between the O-ring 1078 on the flow conduit device and the primary chamber 1044 of the head part 1012 is negated by the opposite rotational drive that is provided by the ribs 1070 acting against the grooves 1092 in the shield wall 1028. Therefore, as the housing head part 1012 and body part 1014 are rotated relative to each other, the flow conduit device 1030 will tend to reside in the body part rather than be drawn away from the body part with the head part. Accordingly, when the head part 1012 and the body part 1014 are separated from each other, the flow conduit device 1030 will remain located within the body part 1014.

In use, the separator assembly is used in a substantially vertical position, with the housing head part 1012 being above the body part 1014. A gas having an entrained material that is to be removed from the gas enters the separator assembly through the inlet port 1020. In the embodiment described, the gas is air and the material is water. The air flows away from the inlet port 1020, and passes over the baffles 1072 of the flow director 1024. The configuration and arrangement of the baffles 1072 impart a helical flow to the gas stream as illustrated by line 1084. Once the gas has passed through the flow director 1024, over the baffles 1072, the gas then flows over the flow deflector 1026. The configuration and arrangement of the flow deflector 1026 forces the gas to flow outwards towards the shield wall 1028.

Due to the water entrained in the gas being heavier than the gas, the water is pushed outward towards the shield wall 1082 as the gas stream spins in a helical manner. This is due to the centrifugal force on the water as the gas/water mixture turns. The water then falls down the inner side 1084 of the shield wall 1082, passes past the shield 1028 through the windows 1052, and collects in the reservoir 1008 at the bottom of the housing body part 1014. The water can be drained from the reservoir 1008 by operating the liquid drainage port 1010.

The gas continues to travel away from the inlet port 1020 in a helical motion, until it reaches the shield 1028. At this point, the gas is reflected off the shield 1030 back toward the housing head part 1012, as illustrated by line 1086. Due to the bowl-shape of the shield 1030, the helical flow of the gas stream is maintained. Further, the shield acts to accelerate the helical flow of gas toward the conduit portion 1032 of the flow conduit device 1030.

The shield 1028 acts as a barrier to the gas flowing past it. The turbulence in the volume of gas in the area below the shield 1028, i.e. between it and the housing body part's 1014 end wall 1036, is less than the turbulence in the volume of gas above the shield. Accordingly, the space between the shield 1028 and the housing body part's 1014 end wall 1036 is known as a "quiet space".

The gas stream then passes through the conduit portion 1032, the flow conduit device 1030, and finally through the primary chamber 1044 before being discharged from the separator assembly 1002 by the outlet port 1022. The smooth change of direction provided by the flow conduit device 1030, and also the vanes 1062, 1064, 1066, help to turn the gas as it passes through the flow conduit device. This helps to reduce turbulence in the flow conduit device 1030 and thereby helps to reduce the drop in pressure across the flow conduit device caused by the change of direction.

What is claimed is:

1. An assembly for collecting material that is entrained in a gas stream, which comprises:
   a. a housing having a head part and a body part, and inlet and outlet ports for the gas that is to be filtered, in which at least one of the ports (the "chamber port") is provided in the head part which has internal walls which define a primary chamber within the head part having a first end communicating with the chamber port and an opening at a second end, in which the axes of the first and second ends of the primary chamber are non-aligned, and
   b. a flow conduit device having a first end which can fit into the primary chamber in the head part of the housing through the opening at the second end so that it is directed generally towards the chamber port in the housing and a second end which is directed towards the body part of the housing to provide a conduit for gas to flow between the body part of the housing and the outlet port, the flow conduit device being configured to have a smooth, continuous transition between the first end and second end of the flow conduit device to reduce turbulence in the flow of gas within the said chamber between the chamber port and the body part of the housing resulting from the non-alignment of the said axes,
   in which the assembly includes a seal between the wall of the primary chamber at or towards the second end thereof and the flow conduit device at the second end thereof.

2. An assembly as claimed in claim 1, in which the axis of the flow conduit device at the first end and the axis of the flow conduit device at the second end are not aligned.

3. An assembly as claimed in claim 2, in which the angle between the axis of the flow conduit device at the first end and the axis of the flow conduit device at the second end is not more than about 150°.

4. An assembly as claimed in claim 1, in which the flow conduit device has a groove formed in its external surface towards the second end thereof and the groove contains an O-ring.

5. An assembly as claimed in claim 1, in which the flow conduit device is approximately circular in cross-section along at least a significant part of its length.

6. An assembly as claimed in claim 1, in which the cross-section of the flow conduit device is generally constant along at least a significant part of its length.

7. An assembly as claimed in claim 1, in which each of the inlet and outlet ports is provided in the head part of the housing.

8. An assembly as claimed in claim 1, in which the port which communicates with the primary chamber is the inlet port.

9. An assembly as claimed in claim 1, in which the port which communicates with the primary chamber is the outlet port.

10. An assembly as claimed in claim 1, in which an angle between the first end and second end of the primary chamber is not more than about 150°.

11. An assembly as claimed in claim 10, in which the flow conduit device has an extension which extends towards a recess within the chamber, and in which the assembly includes an auxiliary seal between the external surface of the extension and the wall of the primary chamber to define an auxiliary chamber in the recess within the chamber, which is isolated by the auxiliary seal from the primary chamber.

12. An assembly as claimed in claim 11, in which the auxiliary chamber contains a device for measuring the difference between the pressure in gas which is flowing towards the filter element and the pressure in gas which has passed through the filter element.

13. An assembly as claimed in claim 11, in which the flow conduit device extension has a groove formed in its external surface and the groove contains an O-ring.

14. An assembly as claimed in claim 13, in which the O-ring is arranged in a plane, and in which the plane of the O-ring is inclined to the axis of the second end of the flow conduit device.

15. An assembly as claimed in claim 14, in which the angle between the plane of the O-ring and the axis of the second end of the flow conduit device is at least about 100°.

16. An assembly as claimed in claim 1, in which the conduit of the flow conduit device is configured to define a continuously-curving flow path from the first end to the second end of the flow conduit device.

17. An assembly for collecting material that is entrained in a gas stream, which comprises:
   a. a housing having a head part and a body part, and inlet and outlet ports for the gas that is to be filtered, in which at least one of the ports (the "chamber port") is provided in the head part which has internal walls which define a primary chamber within the head part having a first end communicating with the chamber port and an opening at a second end, in which the axes of the first and second ends of the primary chamber are non-aligned, and
   b. a flow conduit device having a first end which can fit into the primary chamber in the head part of the housing through the opening at the second end so that it is directed generally towards the chamber port in the housing and a second end which is directed towards the body part of the housing to provide a conduit for gas to flow between the body part of the housing and the outlet port, the flow conduit device being configured to reduce turbulence in the flow of gas within the said chamber between the chamber port and the body part of the housing resulting from the non-alignment of the said axes, in which the assembly includes a seal between the wall of the primary chamber at or towards the second end thereof and the flow conduit device at the second end thereof, and in which the distance between the seal and the first end of the flow conduit device, measured along the centerline thereof is not less than the square root of the cross-sectional area of the flow conduit device at the second end thereof.

18. An assembly for collecting material that is entrained in a gas stream, which comprises:
  a. a housing having a head part and a body part, and inlet and outlet ports for the gas that is to be filtered, in which at least one of the ports (the "chamber port") is provided in the head part which has internal walls which define a primary chamber within the head part having a first end communicating with the chamber port and an opening at a second end, in which the axes of the first and second ends of the primary chamber are non-aligned, and
  b. a flow conduit device having a first end which can fit into the primary chamber in the head part of the housing through the opening at the second end so that it is directed generally towards the chamber port in the housing and a second end which is directed towards the body part of the housing to provide a conduit for gas to flow between the body part of the housing and the outlet port, the flow conduit device being configured to reduce turbulence in the flow of gas within the said chamber between the chamber port and the body part of the housing resulting from the non-alignment of the said axes, in which the assembly includes a seal between the wall of the primary chamber at or towards the second end thereof and the flow conduit device at the second end thereof, and in which the flow conduit device contains at least one vane positioned within it so that the flow of gas along the conduit between the first and second ends thereof passes over the vane and is smoothed by it.

19. An assembly as claimed in claim 18, in which the vane is curved when viewed along its length, generally about a vane axis which is approximately perpendicular to the axis of the first end of the flow conduit device and approximately perpendicular to the axis of the second end of the flow conduit device.

20. An assembly as claimed in claim 18, in which the vane extends across the flow conduit device between the opposite walls thereof.

21. An assembly as claimed in claim 18, in which the flow conduit device contains at least two of the said vanes.

22. An assembly as claimed in claim 18, in which the flow conduit device is formed in first and second matable pieces, in which the first piece comprises a first part of the flow conduit device wall and the vane, and the second piece comprises a second part of the flow conduit device wall which has a recess formed in it in which the end of the vane that is remote from the first part of the conduit wall can be received when the first and second pieces are mated.

23. An assembly as claimed in claim 22, in which the first and second matable pieces of the flow conduit device mate in a plane which contains the first and second conduit openings.

24. An assembly for collecting material that is entrained in a gas stream, which comprises:
  a. a housing having a head part and a body part, and inlet and outlet ports for the gas that is to be filtered, in which at least one of the ports (the "chamber port") is provided in the head part which has internal walls which define a primary chamber within the head part having a first end communicating with the chamber port and an opening at a second end, in which the axes of the first and second ends of the primary chamber are non-aligned, and
  b. a flow conduit device having a first end which can fit into the primary chamber in the head part of the housing through the opening at the second end so that it is directed generally towards the chamber port in the housing and a second end which is directed towards the body part of the housing to provide a conduit for gas to flow between the body part of the housing and the outlet port, the flow conduit device being configured to reduce turbulence in the flow of gas within the said chamber between the chamber port and the body part of the housing resulting from the non-alignment of the said axes, in which the assembly includes a seal between the wall of the primary chamber at or towards the second end thereof and the flow conduit device at the second end thereof, in which the assembly further includes a tubular filter element having a wall of a filtration medium which defines a hollow space within it so that the gas stream flows through its wall, and in which the flow conduit device communicates at its second end with the hollow space within the filter element.

25. An assembly as claimed in claim 24, in which the filter element has an end cap with an opening through which gas flows between the flow conduit device and the hollow space within the filter element, and which defines an end of the hollow space, and the filter element fits into the body part of the housing, and in which the end cap and the body part have interengaging formations in the form of at least one rib and at least one groove, arranged so that the rib can be slid into the groove when the filter element is fitted into the body part, and so that the filter element rotates with the body part relative to the head part.

26. A tubular filter element for collecting material that is entrained in a flow stream, which has a wall of a filtration medium which defines a hollow space within it so that a flow stream can flow through the wall to be filtered, the filter element having a flow conduit device with a first end directed outwardly, in use towards a port in a housing for the element, and a second end which is directed towards the hollow space within the element, in which the axis of the flow conduit device at the first end and the axis of the flow conduit at the second end intersect each other, the element being configured to form a seal between the flow conduit device and an adjacent wall of a housing, in a region of the flow conduit device that is at or close to the second end thereof.

27. A filter element as claimed in claim 26, in which the element includes a seal component on the flow conduit device, for forming a seal between the flow conduit device and an adjacent wall of the housing.

28. A filter element as claimed in claim 27, in which the seal component comprises a compressible O-ring, preferably located in a groove on the flow conduit device.

29. An assembly for collecting material that is entrained in a gas stream, which comprises a tubular filter element having a wall of a filtration medium which defines a hollow space within it, arranged for the gas stream to flow through its wall, and a housing in which the filter element is located, the housing comprising a head part and a body part in which the filter element is located and having inlet and outlet ports for the gas that is to be filtered, in which:
- a. at least one of the ports is provided in the head part, and the head part has internal walls which define a primary chamber within it communicating with the said port and with the hollow space within the tubular filter element, with the axis of the port and the axis of the tubular filter element being non-aligned,
- b. the filter element includes a flow conduit device having a first end which is directed generally towards the port in the housing and a second end which is directed towards the hollow space within the tubular filter element, the assembly including a seal between the wall of the primary chamber at or towards the free end thereof and the flow conduit at the second end thereof, the flow conduit extending from the hollow space into the primary chamber and being configured to reduce turbulence in the flow of gas within the said chamber between the port and the hollow space resulting from the non-alignment of the said axes.

30. A separator assembly for collecting material that is entrained in a gas stream, which comprises:
- a. a housing having a head part and a body part, and inlet and outlet ports for the gas that is to be filtered, in which at least the outlet port is provided in the head part which has internal walls which define a primary chamber within the head part having a first end communicating with the outlet port and an opening at a second end, in which the axes of the first and second ends of the primary chamber are non-aligned
- b. a flow conduit device having a first end which can fit into the primary chamber in the head part of the housing through the opening at the second end so that it is directed generally towards the outlet port in the housing and a second end which is directed towards the body part of the housing to provide a conduit for gas to flow between the body part of the housing and the outlet port, the flow conduit device being configured to reduce turbulence in the flow of gas within the said chamber between the outlet port and the body part of the housing resulting from the non-alignment of the said axes,
- c. an outlet tube extending from the second end of the flow conduit device into the housing body through which gas flows between the housing body and the outlet port, and
- d. a flow director located downstream of the inlet port so that gas flowing into the housing flows over the flow director and so that the incoming gas is made to follow a generally helical path within the housing, in which the assembly includes a seal between the wall of the primary chamber at or towards the second end thereof and the flow conduit device at the second end thereof.

31. An assembly for collecting material that is entrained in a flow stream, which comprises:
- a. a housing having a head part and a body part, and inlet and outlet ports in the head for the flow to be filtered, in which the head part has internal walls which define a first chamber for flow through the head part between a first one of the inlet and outlet ports, and the body part of the housing, and a second chamber for the flow between a second one of the inlet and outlet ports and the body of the housing, and in which the first chamber has a first end communicating with the first one of the ports and an opening at a second end for communicating with the body part of the housing, in which the axes of the first and second ends of the first chamber are non-aligned, and
- b. a flow conduit device having a first end which can fit into the first chamber in the head part of the housing through the opening at the second end so that it is directed generally towards the first one of the inlet and outlet ports in the housing and a second end which is directed towards the body part of the housing to provide a conduit for flow between the first one of the ports and the body part of the housing through the first chamber, the flow conduit device being configured to reduce turbulence in the flow within the first chamber between the first one of the ports and the body part of the housing resulting from the non-alignment of the said axes, in which the assembly includes a seal between the wall of the first chamber in the head part of the housing and the flow conduit device to separate (i) the flow stream flowing between the first one of the ports and the body part through the head part through the first chamber and through the flow conduit device, and (ii) the flow stream flowing between the body part and the second one of the inlet and outlet ports through the second chamber.

32. The assembly as claimed in clam 31, wherein the flow conduit device has a smooth, continuous transition between the first end and the second end of the flow conduit device.

33. An assembly for collecting material that is entrained in a flow stream, which comprises a tubular filter element having a wall of filtration medium which defines a hollow space within it, arranged for the flow stream to flow through its wall, and al housing in which the filter element is located, the housing comprising a head part and a body part in which the filter element is located and having inlet and outlet ports for the flow that is to be filtered, in which:
- a. the inlet and outlet ports are provided in the head part, and the head part has internal walls which define:
  - i. a primary chamber for flow through the head part between a first one of the inlet and outlet ports and the hollow space within the tubular filter element, with the axis of the first of the inlet and outlet ports and the axis of the tubular filter element being non-aligned, and
  - ii. an auxiliary chamber for flow between the second one of the inlet and outlet ports and the body of the housing.
- b. the filter element includes a flow conduit device having a first end which is directed generally towards the first of the inlet and outlet ports in the housing and a second end which is directed towards the hollow space within the tubular filter element, the assembly including a seal between the wall of the primary chamber at or towards the free end thereof and the flow conduit at the second end thereof, the flow conduit extending from the hollow space into the primary chamber and being configured to reduce turbulence in the flow within the said chamber between the port and the hollow space resulting from the non-alignment of the said axes.

34. The assembly as in claim 33, wherein the flow conduit device has a smooth, continuous transition between the first end and the second end of the flow conduit device.

* * * * *